(12) United States Patent
Nakauchi et al.

(10) Patent No.: US 7,472,688 B2
(45) Date of Patent: Jan. 6, 2009

(54) IGNITION DEVICE FOR INTERNAL COMBUSTION ENGINE

(75) Inventors: Kiyotada Nakauchi, Numazu (JP); Masayuki Sugiyama, Numazu (JP); Yasukazu Hatano, Numazu (JP); Akira Shimoyama, Numazu (JP)

(73) Assignee: Kokusan Denki Co., Ltd., Numazu-shi (JP)

( * ) Notice: Subject to any disclaimer, the term of this patent is extended or adjusted under 35 U.S.C. 154(b) by 100 days.

(21) Appl. No.: 11/758,848

(22) Filed: Jun. 6, 2007

(65) Prior Publication Data
US 2007/0277782 A1 Dec. 6, 2007

(30) Foreign Application Priority Data
Jun. 6, 2006 (JP) ............................. 2006-156920

(51) Int. Cl.
*F02P 5/00* (2006.01)
*F02P 3/05* (2006.01)
*F02N 17/00* (2006.01)

(52) U.S. Cl. ........................... 123/406.53; 123/406.57; 123/179.5; 123/618

(58) Field of Classification Search ............ 123/406.53, 123/406.54, 406.57, 179.5, 596–597, 605, 123/618
See application file for complete search history.

(56) References Cited

FOREIGN PATENT DOCUMENTS

| JP | 2001-304084 | * 10/2001 |
|---|---|---|
| JP | 2003307171 | 10/2003 |

\* cited by examiner

*Primary Examiner*—Hai H Huynh
(74) *Attorney, Agent, or Firm*—Pearne & Gordon LLP

(57) ABSTRACT

A capacitor discharge ignition device for an internal combustion engine including: idling time advance angle control permission condition determination means for determining whether an idling time advance angle control permission condition is met that is a condition for permitting control to advance an ignition position during idling immediately after completion of the start of the engine in order to stabilize idling immediately after completion of the start of the internal combustion engine; and idling time advance angle control means for advancing the ignition position during idling immediately after completion of the start of the internal combustion engine when it is determined that the idling time advance angle control permission condition is met.

15 Claims, 18 Drawing Sheets

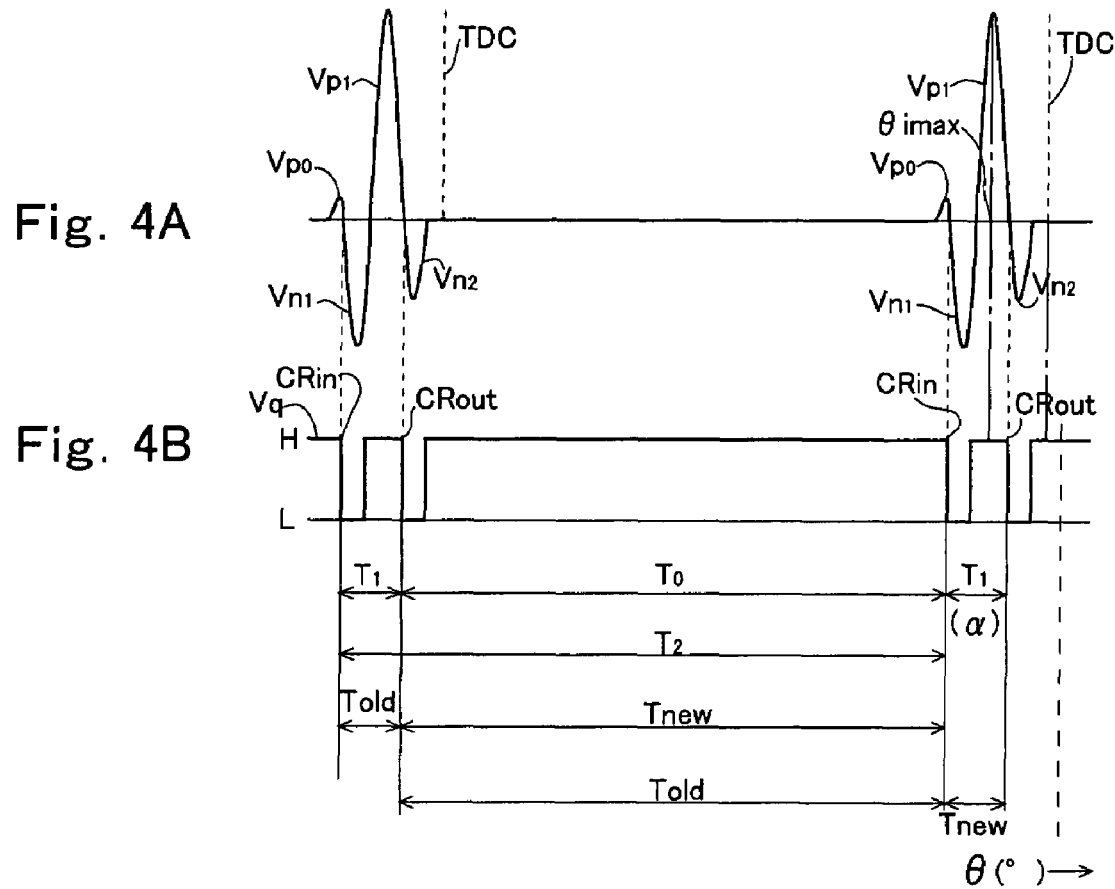
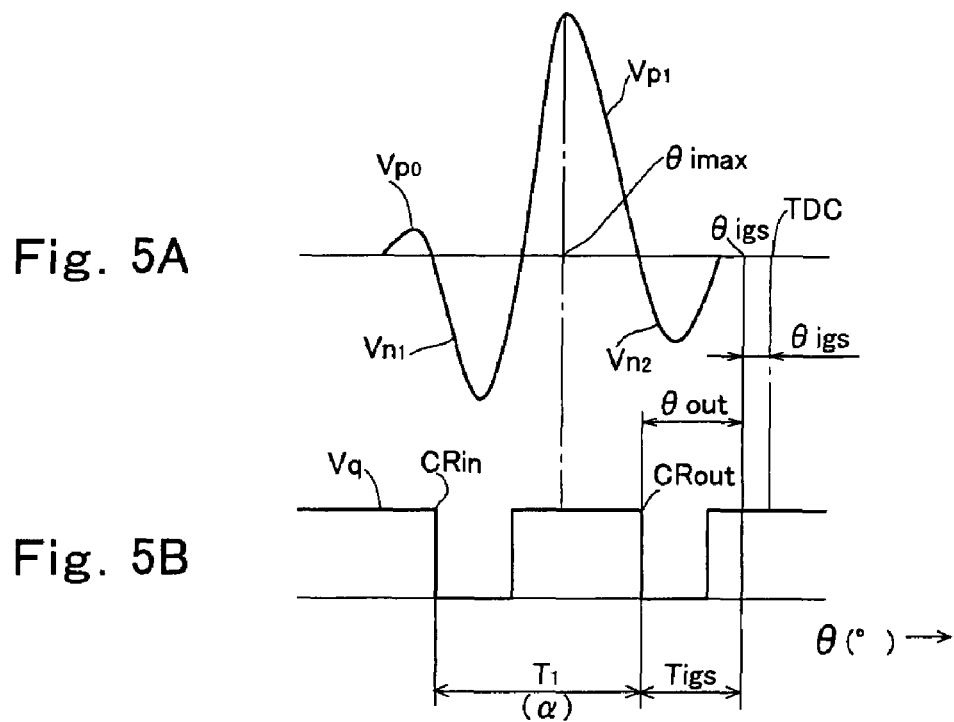

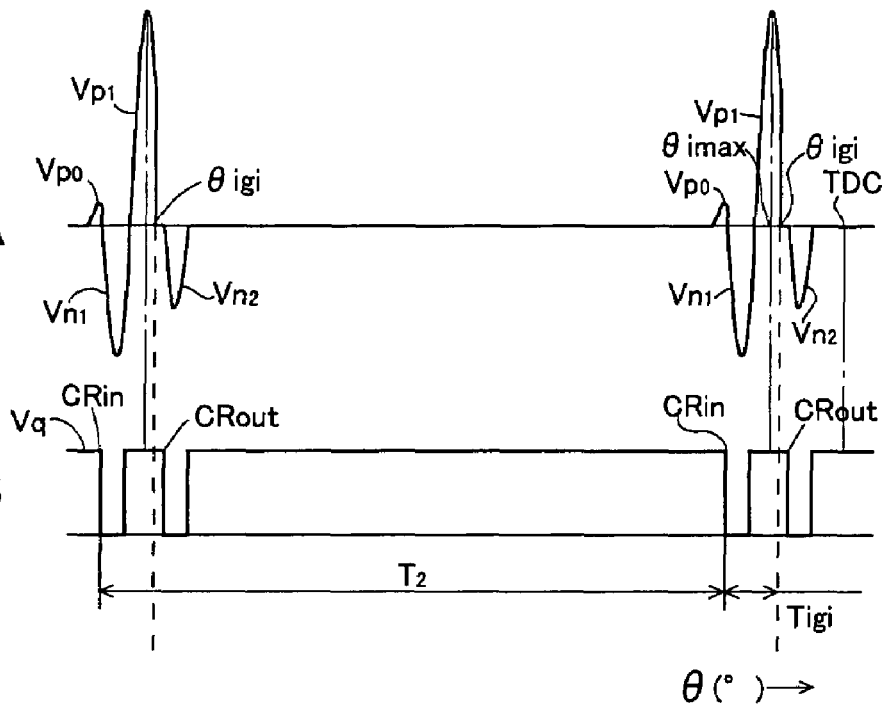
Fig. 6A
Fig. 6B
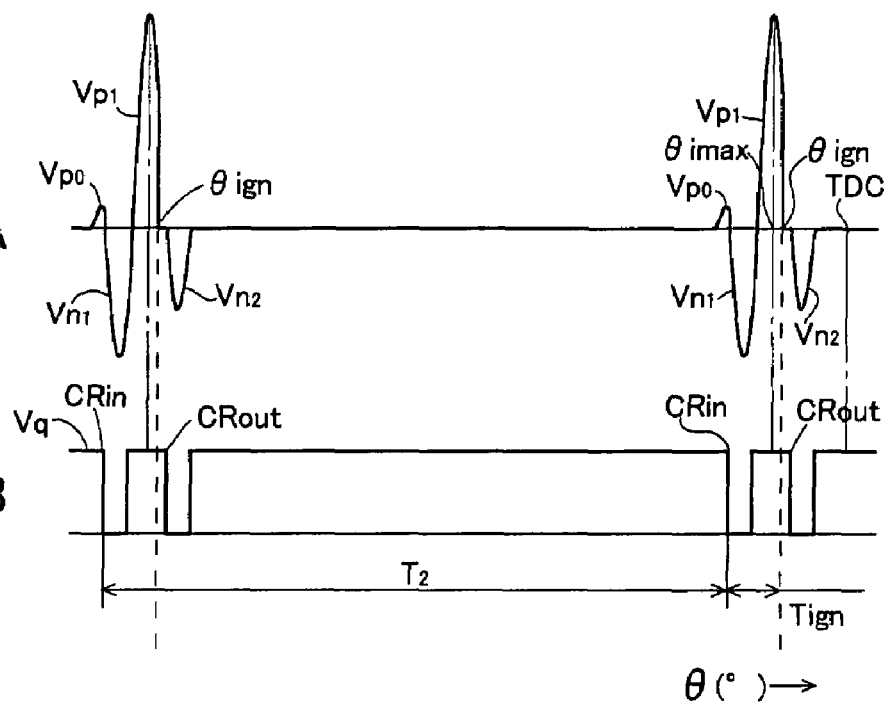
Fig. 7A
Fig. 7B

Idle_cnt: idling time advance angle control counter
IDLENUM: idling time advance angle control number set value
θigi: ignition timing in idling time advance angle control
Tigi: time between CRin and ignition in idling time advance angle control
SNCHNE: start completion determination speed θigi: ignition timing in idling time advance angle control
Tigi: time between CRout and ignition in idling time advance angle control

IGNITION DEVICE FOR INTERNAL COMBUSTION ENGINE

TECHNICAL FIELD OF THE INVENTION

The present invention relates to a capacitor discharge ignition device for an internal combustion engine.

PRIOR ART OF THE INVENTION

A capacitor discharge ignition device for an internal combustion engine is comprised of an ignition coil, an ignition capacitor that is provided on a primary side of the ignition coil and charged to one polarity by an output of an ignition power supply, a discharge switch that conducts when receiving an ignition signal and discharges charges accumulated in the ignition capacitor through the primary coil of the ignition coil, and an ignition control portion that provides the ignition signal to the discharge switch in an ignition position of the internal combustion engine. As the ignition power supply, an exciter coil is often used provided in a magnet type AC generator mounted to the engine.

Recent internal combustion engine driven vehicles or internal combustion engine driven devices require complicated control of an ignition position (a crank angle position for an ignition operation) of the engine with respect to various control conditions including a rotational speed of the engine in order to reduce noises generated by the engine, clean exhaust gas, and allow efficient driving. Thus, even in an internal combustion engine that places importance on cost reduction, an ignition device including an ignition control portion using a microprocessor is used.

In controlling an ignition position using a microprocessor, information on a specific crank angle position of an engine, for example, crank angle information indicating that a crank angle position of the engine matches a reference crank angle position having a certain relationship with a top dead center position (a crank angle position when a piston reaches a top dead center) is obtained by some method, a rotational speed of the engine is arithmetically operated based on the crank angle information, and the ignition position of the engine is arithmetically operated with respect to various control conditions including the arithmetically operated rotational speed. The ignition position of the engine is arithmetically operated as an angle from the reference crank angle position to the ignition position, or an advance angle from the top dead center of the engine to the ignition position. The angle that provides the arithmetically operated ignition position is converted to ignition position detecting time data using the rotational speed of the engine at that time. The ignition position detecting time data is time required for a crankshaft to rotate from the reference crank angle position to the ignition position at the rotational speed of the engine at that time (time measured by a timer in the microprocessor). The ignition control portion recognizes that the crank angle position of the engine matches the reference crank angle position when a signal indicating the reference crank angle position is generated, sets the ignition position detecting time data in an ignition position measuring timer (referred to as an ignition timer), and generates an ignition signal when the ignition timer completes measurement of the set time data.

As a signal source for obtaining crank angle information of an engine, a pulser (a pulse signal generator) is used that generates a pulse signal in a reference crank angle position of the engine. In the case of placing importance on cost reduction, however, the pulser is sometimes required to be omitted.

As disclosed in, for example, Japanese Patent Application Laid-Open Publication No. 2003-307171, some pulserless type ignition devices including no pulser obtain crank angle information from an output voltage of an exciter coil originally provided as a power supply for charging an ignition capacitor. In the case of obtaining the crank angle information from the output voltage of the exciter coil, as shown in FIG. 23, a magneto generator is comprised so that the exciter coil generates an AC voltage once for one cylinder during one turn of a crankshaft in forward rotation of an engine, the AC voltage having a half wave of a positive voltage $V_{p1}$ with a sufficiently high peak value for charging the ignition capacitor, and a half wave of first and second negative voltages $V_{n1}$ and $V_{n2}$ generated before and after the positive voltage.

In the ignition device disclosed in Japanese Patent Application Laid-Open Publication No. 2003-307171, the second negative voltage $V_{n2}$ is set to be generated immediately before a top dead center position (a crank angle position when a piston of the engine reaches a top dead center) TDC of the engine, a crank angle position $\theta_{i0}$ when the second negative voltage $V_{n2}$ passes the peak and then decreases to a set level $V_{s1}$ is set as an ignition position at the start, and a crank angle position $\theta_{i1}$ immediately after the peak position of the second negative voltage $V_{n2}$ is set as an ignition position during idling. The positive voltage $V_{p1}$ is compared with a set voltage $V_{s2}$, and a crank angle position when the positive voltage $V_{p1}$ becomes equal to the set voltage $V_{s2}$ is detected as a reference crank angle position $\theta_s$. The reference crank angle position $\theta_s$ is a position for capturing time data for calculating a rotational speed of the engine, and for starting measurement of the arithmetically operated ignition position. The reference crank angle position $\theta_s$ is set in a position further advanced from an ignition position when an advance angle width becomes the maximum.

The microprocessor captures time measured by a timer for each detection of the reference crank angle position $\theta_s$, calculates time between the last detection of the reference crank angle position and this detection of the reference crank angle position (time required for one turn of the crankshaft) as rotational speed detecting time data, and arithmetically operates the rotational speed of the engine from the time data. The microprocessor also arithmetically operates the ignition position of the engine with respect to control conditions including the arithmetically operated rotational speed, calculates time required for the engine to rotate from the reference crank angle position to the arithmetically operated ignition position at that rotational speed as ignition position detecting time data, sets the time data in the ignition timer in the reference crank angle position, and starts measurement thereof.

In such a conventional ignition device, start time ignition control is performed at the start of the engine, and immediately after completion of the start of the engine is detected, the control is shifted to ignition control in normal operation. In the start time ignition control, an ignition signal is generated to perform an ignition operation when the crank angle position $\theta_{i0}$ is detected, and the control is shifted to normal operation time ignition control when the rotational speed of the engine reaches a start completion determination speed or higher. In the normal operation time ignition control, the ignition signal is generated in the crank angle position $\theta_{i1}$ to perform the ignition operation during idling of the engine, and the ignition signal is generated in the ignition position arithmetically operated with respect to the control conditions such as the rotational speed of the engine to perform the ignition operation in normal operation other than idling.

In the specification, the start time of the internal combustion engine means a transition period between the commencement of the start operation of the engine and the completion of the start of the engine allowing the engine to maintain rotation.

In the conventional pulserless type ignition device, the ignition position detecting time data set in the ignition timer in the reference crank angle position $\theta_s$ in FIG. 23 is time data arithmetically operated based on the rotational speed arithmetically operated from the rotational speed detecting time data measured one turn before of the engine. In normal operation of the engine, the rotational speed of the crankshaft is stable, and thus there is no problem in measuring the ignition position using the ignition position detecting time data calculated based on the rotational speed arithmetically operated from the rotational speed detecting time data measured one turn before. However, at the start of the engine, the rotational speed of the crankshaft minutely varies with stroke changes of the engine, and thus when the ignition position detecting time data is calculated based on the rotational speed arithmetically operated from the rotational speed detecting time data measured one turn before of the engine, the ignition position at the start of the engine is improper, thereby inevitably preventing startability of the engine.

Thus, the applicant has proposed, in Japanese Patent Application Laid-Open Publication No. 2005-27649, a pulserless type ignition device for an internal combustion engine in which an ignition position can be determined based on rotational speed information of the engine calculated immediately before the ignition position at the start of the engine to increase startability of the engine. In the proposed ignition device, when the internal combustion engine is at the start, time between detection of a generation position of a first negative voltage and detection of a generation position of a second negative voltage is measured in the generation position of the second negative voltage, ignition position detecting time data at the start of the engine is calculated using information on a rotational speed of the engine obtained from the measured time, and measurement of the time data is immediately started to detect the ignition position at the start and generate an ignition signal.

In the proposed ignition device, the ignition position can be determined based on the rotational speed information of the engine calculated immediately before the ignition position at the start of the engine when the rotational speed of the crankshaft minutely varies. This can precisely determine the ignition position at the start to stabilize rotation of the engine, and increase startability of the engine.

However, in the proposed ignition device, since control is shifted to normal control immediately after the internal combustion engine has completed the start, idling is not stabilized until the engine warms up in cold climates.

SUMMARY OF THE INVENTION

An object of the present invention is to provide an ignition device for an internal combustion engine that can precisely determine an ignition position at the start of the engine to improve startability of the engine, and can stabilize idling immediately after the start of the engine even in cold climates.

The present invention is applied to an ignition device for an internal combustion engine including: an exciter coil that is provided in an AC generator that rotates in synchronism with the internal combustion engine, and generates an AC voltage once for one turn of a crankshaft of the internal combustion engine, the AC voltage having a half wave of a positive voltage and a half wave of first and second negative voltages generated before and after the half wave of the positive voltage; an ignition capacitor provided on a primary side of an ignition coil and charged to one polarity by the positive voltage; a discharge switch that conducts when receiving an ignition signal and discharges charges accumulated in the ignition capacitor through a primary coil of the ignition coil; and an ignition control portion that provides the ignition signal to the discharge switch in an ignition position of the internal combustion engine.

The ignition control portion used in the present invention includes: start completion determination means for determining whether the internal combustion engine is at the start or has completed the start; start time ignition control means for arithmetically operating an ignition position detecting time data which is a time to be measured for detecting an ignition position of the engine when the rotational position of the engine and a generation position of the second negative voltage are met and controlling a generation position of the ignition signal by immediately starting measurement of the arithmetically operated time data so that the ignition position of the engine is set in a position suitable at the start of the engine, wherein the time data is a time required for the engine to rotate from a generation position of the second negative voltage to the ignition position suitable at the start of the engine at a rotational speed calculated from time between when the first negative voltage is generated and when the second negative voltage is generated; idling time advance angle control permission condition determination means for determining whether an idling time advance angle control permission condition is met that is a condition for permitting idling time advance angle control to advance an ignition position during idling immediately after completion of the start of the internal combustion engine from an ignition position during idling in normal operation in order to stabilize idling immediately after completion of the start of the internal combustion engine; idling time advance angle control means for controlling the generation position of the ignition signal so that when the idling time advance angle control permission condition determination means determines that the idling time advance angle control permission condition is met, the ignition position during idling immediately after completion of the start of the internal combustion engine is advanced from the ignition position during idling in normal operation; and normal operation time ignition control means for controlling the generation position of the ignition signal so that when the start completion determination means determines that the internal combustion engine has completed the start, and the idling time advance angle control permission condition determination means determines that the idling time advance angle control permission condition is not met, the ignition position is set in a position suitable in normal operation of the internal combustion engine.

Herein, positive and negative polarities of half wave voltages of the AC voltage output by the exciter coil do not mean polarities in a waveform chart, but among half wave voltages of one and the other polarities of the AC voltage output by the exciter coil, a half wave voltage having a polarity used for charging the ignition capacitor of an ignition circuit is a positive voltage, and a half wave voltage having a polarity opposite to the polarity used for charging the ignition capacitor is a negative voltage.

In a preferred aspect of the present invention, the ignition control portion is comprised of the following components:

(a) ignition signal generation means including an ignition timer that measures ignition position detecting time data for generating the ignition signal when the ignition timer completes the measurement of the ignition position detecting time data;

(b) negative voltage generation position detection means for detecting a generation position of the first negative voltage and a generation position of the second negative voltage;

(c) start completion determination means for determining whether the internal combustion engine is at the start or has completed the start;

(d) start time ignition control means for arithmetically operating the ignition position detecting time data when the rotational position of the engine and a generation position of the second negative voltage are met and controlling a generation position of the ignition signal by causing the ignition timer to immediately start measurement of the arithmetically operated time data so that the ignition position of the engine is set in a position suitable at the start of the engine, wherein the time data is a time required for the engine to rotate from a generation position of the second negative voltage to the ignition position suitable at the start of the engine at a rotational speed calculated from time between when the first negative voltage is detected and when the second negative voltage is detected;

(e) idling time advance angle control permission condition determination means for determining whether an idling time advance angle control permission condition is met that is a condition for permitting idling time advance angle control to advance an ignition position during idling immediately after completion of the start of the internal combustion engine from an ignition position during idling in normal operation in order to stabilize idling immediately after completion of the start of the internal combustion engine;

(f) idling time advance angle control means for controlling the generation position of the ignition signal so that when the idling time advance angle control permission condition determination means determines that the idling time advance angle control permission condition is met, the ignition position during idling immediately after completion of the start of the internal combustion engine is advanced from the ignition position during idling in normal operation; and (g) normal operation time ignition control means for controlling the generation position of the ignition signal so that when the start completion determination means determines that the internal combustion engine has completed the start, and the idling time advance angle control permission condition determination means determines that the idling time advance angle control permission condition is not met, the ignition position is set in a position suitable in normal operation of the internal combustion engine.

In a preferred aspect of the present invention, the idling time advance angle control means is comprised so as to arithmetically operate the ignition position detecting time data when the rotational position of the engine and a generation position of the second negative voltage are met and control the ignition position of the engine to be advanced from the ignition position during idling in normal operation by causing the ignition timer to start measurement of the arithmetically operated time data at a generation position of the first negative voltage, wherein the ignition position detecting time data is a time required for the engine to rotate from the generation position of the first negative voltage to the idling time advance angle ignition position advanced from the ignition position in normal operation of the engine at an idling speed calculated from a detection cycle of the generation position of the first negative voltage.

In another preferred aspect of the present invention, the idling time advance angle control means is comprised so as to arithmetically operate the ignition position detecting time data when the rotational position of the engine and a generation position of the second negative voltage are met and control the ignition position of the engine to be advanced from the ignition position during idling in normal operation by causing the ignition timer to immediately start measurement of the arithmetically operated time data, wherein the ignition position detecting time data is a time required for the engine to rotate from the generation position of the second negative voltage to the idling time advance angle ignition position advanced from the ignition position in normal operation of the engine at an idling speed calculated from a time between when the generation position of the first negative voltage is detected and when the generation position of the second negative voltage is detected and an angle between the generation position of the first negative voltage and the generation position of the second negative.

In a further preferred aspect of the present invention, the idling time advance angle control permission condition determination means is comprised so as to determine that the idling time advance angle control permission condition is met when the number of ignitions by the idling time advance angle control means is equal to or smaller than a set value, and determine that the idling time advance angle control permission condition is not met when the number of ignitions by the idling time advance angle control means exceeds the set value.

In a further preferred aspect of the present invention, the idling time advance angle control permission condition determination means is comprised so as to determine that the idling time advance angle control permission condition is met when an elapsed time from the start of control of the ignition position by the idling time advance angle control means is equal to or shorter than a set time, and determine that the idling time advance angle control permission condition is not met when the elapsed time from the start of control of the ignition position by the idling time advance angle control means exceeds the set time.

In a further preferred aspect of the present invention, the idling time advance angle control permission condition determination means is comprised so as to determine that the idling time advance angle control permission condition is met when a period in which the rotational speed of the internal combustion engine is continuously equal to or higher than an idling time advance angle control determination speed does not reach a set certain period, and determine that the idling time advance angle control permission condition is no longer met when the period in which the rotational speed of the internal combustion engine is continuously equal to or higher than the idling time advance angle control determination speed reaches the set certain period.

In a further preferred aspect of the present invention, the idling time advance angle control permission condition determination means is comprised so as to determine that the idling time advance angle control permission condition is met when a period in which the rotational speed of the internal combustion engine is continuously equal to or higher than a set idling time advance angle control determination speed does not reach a set certain period, and when the number of ignitions by the idling time advance angle control means is equal to or smaller than a set value, and determine that the idling time advance angle control permission condition is no longer met when the period in which the rotational speed of the internal combustion engine is continuously equal to or higher than the idling time advance angle control determination speed reaches the certain period, and when the number of ignitions by the idling time advance angle control means reaches the set value though the period in which the rotational speed of the internal combustion engine is continuously equal to or higher than the idling time advance angle control determination speed does not reach the certain period.

As described above, the idling time advance angle control means is provided for controlling the generation position of the ignition signal so as to advance the ignition position of the internal combustion engine from the ignition position during idling in normal operation when the start completion determination means determines that the internal combustion engine has completed the start, and the idling time advance angle control permission condition determination means determines that the condition for performing the idling time advance angle control is met. This can prevent a reduction in rotational speed of the engine during idling immediately after completion of the start and maintain rotation of the engine, thereby allowing idling immediately after the start of the engine to be stabilized in a short time even in cold climates or the like where the rotation of the engine becomes unstable.

In the present invention, the idling time advance angle control is performed only when the predetermined idling time advance angle control permission condition (the condition for permitting control to advance the ignition position from the ignition position during idling in normal operation in order to stabilize idling immediately after the start) is met, thereby allowing the idling immediately after the start to be stabilized without an unnecessary increase in idling speed immediately after the start or the like.

Particularly, in the present invention, in the case where the idling time advance angle control is performed only until the period in which the rotational speed of the internal combustion engine is continuously equal to or higher than the idling time advance angle control determination speed reaches the set certain period, or the case where the idling time advance angle control is performed when the period in which the rotational speed of the internal combustion engine is continuously equal to or higher than the set idling time advance angle control determination speed does not reach the set certain period and the number of ignitions by the idling time advance angle control means is equal to or smaller than the set value, the idling time advance angle control is performed to reliably prevent a rapid increase in the rotational speed of the engine, thereby allowing the idling immediately after the start to be stabilized without providing uncomfortable feeling to a driver.

In the present invention, when the internal combustion engine is at the start, the start time ignition control means measures time $T_1$ between detection of the generation position of the first negative voltage and detection of the generation position of the second negative voltage in the generation position of the second negative voltage, calculates time data for detecting the ignition position at the start of the engine using rotational speed information of the engine obtained from the measured time $T_1$, and immediately starts measurement of the time data to detect the ignition position at the start and generate the ignition signal at the start.

When the start time ignition control means is thus comprised, at the start of the engine when the rotational speed of the crankshaft of the engine minutely varies, the ignition position at the start can be detected based on rotational speed information of the engine calculated immediately before the ignition position at the start. Thus, the ignition position at the start can be precisely detected to improve startability of the engine. When the start time ignition control means is comprised as described above, the ignition position at the start of the engine can be set in a position delayed from the generation position of the second negative voltage (a position beyond a section where the exciter coil generates the AC voltage), and thus a wide advance angle width of the ignition position can be obtained.

An arithmetical operation of the ignition position detecting time data in normal operation may be performed in the generation position of the second negative voltage, but for precise measurement of the arithmetically operated ignition position in normal operation, it is preferable to arithmetically operate time data for detecting the ignition position of the engine from the rotational speed calculated immediately before the position where the measurement of the ignition position is started. Thus, timing for performing the arithmetical operation of the ignition position detecting time data in normal operation and a processing for causing the ignition timer to start the measurement of the time data is preferably timing for the generation of the first negative voltage.

Thus, in a preferred aspect of the present invention, the normal operation time ignition control means is comprised so as to perform a process of arithmetically operating an ignition position in normal operation of the internal combustion engine arithmetically operated with respect to the rotational speed of the internal combustion engine calculated from a generation cycle of the first negative voltage, and time required for the engine to rotate from the generation position of the first negative voltage to the arithmetically operated ignition position in normal operation at the rotational speed of the internal combustion engine calculated from the generation cycle of the first negative voltage, as the ignition position detecting time data in normal operation, and a process of causing the ignition timer to start the measurement of the ignition position detecting time data in normal operation, when the generation position of the first negative voltage is detected.

As described above, when the processing for measuring the ignition position in normal time is performed in the generation position of the first negative voltage before the generation position of the second negative voltage for performing the processing for measuring the ignition position at the start of the engine (the generation position of the first negative voltage is set as a reference crank angle position for determining the ignition position in normal operation), a wide advance angle width of the ignition position can be obtained, and also the arithmetically operated ignition position can be precisely detected to control the ignition position with high accuracy.

The negative voltage generation position detection means may be comprised so as to detect the generation position of the first negative voltage and the generation position of the second negative voltage from a difference in length between time between the detection of the generation position of the first negative voltage and the detection of the generation position of the second negative voltage and time between the detection of the generation position of the second negative voltage and detection of the next generation position of the first negative voltage.

In a preferred aspect of the present invention, the ignition device further includes: a waveform shaping circuit that converts an output voltage of the exciter coil as an input to a rectangular wave signal having a trailing edge in the generation position of the negative voltage; and elapsed time measurement means for recognizing the trailing edge of the rectangular wave signal as a crank signal, reading a measurement value of the timer for each recognition of the crank signal, and measuring an elapsed time between generation of the last crank signal and generation of this crank signal. In this case, the negative voltage generation position detection means may be comprised so as to compare an elapsed time $T_{old}$ detected last time by the elapsed time measurement means with an elapsed time $T_{new}$ detected this time, detect that this generation position of the crank signal is the generation position of the first negative voltage when the relationship of $T_{new}<T_{old}/k$ (k is a constant equal to or larger than one) is not met, and detect that this generation position of the crank signal is the generation position of the second negative voltage when the relationship of $T_{new}<T_{old}/k$ is met.

The value of the constant k is set to be larger than one, and smaller than the value of an angle between the generation position of the second negative voltage generated in forward rotation of the internal combustion engine and the next generation position of the first negative voltage, divided by an angle between the generation position of the first negative voltage and the generation position of the second negative voltage. The value of the constant k is set to an appropriate value, thereby eliminating the risk of accidentally detecting the generation position of the first negative voltage and the generation position of the second negative voltage in sudden acceleration or sudden deceleration of the engine.

In a further preferred aspect of the present invention, the ignition device further includes: a waveform shaping circuit that converts an output voltage of the exciter coil to a rectangular wave signal having a leading edge in the generation position of the negative voltage; and elapsed time measurement means for recognizing the leading edge of the rectangular wave signal as a crank signal, reading a measurement value of the timer for each recognition of the crank signal, and measuring an elapsed time between generation of the last crank signal and generation of this crank signal. Also in this case, the negative voltage generation position detection means may be comprised so as to compare an elapsed time $T_{old}$ detected last time by the elapsed time measurement means with an elapsed time $T_{new}$ detected this time, detect that this generation position of the crank signal is the generation position of the first negative voltage when the relationship of $T_{new}<T_{old}/k$ (k is a constant equal to or larger than one) is not met, and detect that this generation position of the crank signal is the generation position of the second negative voltage when the relationship of $T_{new}<T_{old}/k$ is met.

The start completion determination means may be comprised so as to determine that the internal combustion engine is at the start when the rotational speed of the internal combustion engine is lower than a start completion determination speed, and determine that the internal combustion engine has completed the start when the rotational speed of the internal combustion engine is equal to or higher than the start completion determination speed continuously for a certain period. The start completion determination speed is set to be equal to the rotational speed when the internal combustion engine has completed the start.

The start completion determination means may be also comprised so as to determine that the internal combustion engine is at the start when the rotational speed of the internal combustion engine is lower than the start completion determination speed, and the number of rotations of the crankshaft of the engine after the commencement of the start operation of the internal combustion engine is equal to or smaller than a set number, and determine that the internal combustion engine has completed the start when the rotational speed of the internal combustion engine is equal to or higher than the start completion determination speed continuously for a certain period, and when the number of rotations of the crankshaft of the engine after the commencement of the start operation of the internal combustion engine exceeds the set number though the rotational speed of the internal combustion engine is lower than the start completion determination speed. In this case, the set number is set to a value corresponding to the maximum number of rotations of the crankshaft when cranking is manually performed in a state where the internal combustion engine cannot be started (for example, in a state where the ignition operation of the ignition device is stopped).

When the start completion determination means is comprised as described above, the number of rotations of the crankshaft after the commencement of the start operation of the internal combustion engine does not exceed the set number in the case where the engine is started by a manual starter device such as a recoil starter, and thus it is determined that the engine is at the start when the rotational speed of the engine is lower than the start completion determination speed, and it is determined that the start has been completed when the rotational speed of the engine is equal to or higher than the start completion determination speed continuously for a certain period (in normal operation). Thus, in the case where the engine is manually started, the ignition position at the start can be set in a position suitable at the start near the top dead center position, thereby improving startability of the engine.

On the other hand, in the case where the engine is started by cranking using a starter motor, the rotation of the engine is maintained by the starter motor even without voluntary rotation of the engine. In this case, if only one ignition position (start time ignition position) suitable at the start is set in a position near the top dead center position, ignition is performed in the set start time ignition position when it is determined that the rotational speed is lower than the set rotational speed at the start, and ignition is shifted to normal ignition when the rotational speed reaches the set rotational speed, pulsing of cranking may be more likely to prevent a piston from exceeding the top dead center and cause the piston to be pushed back.

In order to prevent such a problem, in a preferred aspect of the present invention, a plurality of start time ignition positions are previously set, and an optimum ignition position is selected from the plurality of ignition positions set as the start time ignition positions according to the rotational speed arithmetically operated from a detection cycle of the generation position of the first negative voltage.

For example, it is preferable that two start time ignition positions: a first start time ignition position near the top dead center position, and a second start time ignition position advanced from the first start time ignition position (an ignition position suitable as an ignition position during idling) are set as the ignition positions suitable at the start, an ignition position switching rotational speed IGCHNE for switching the start time ignition position, and a start completion determination speed SNCHNE for determining whether the engine is in operation at the start are set, ignition is performed in the first start time ignition position near the top dead center position when IGCHNE<rotational speed, and the ignition operation is performed in the second start time ignition position when IGCHNE≦rotational speed<SNCHNE.

Comprised as described above, for example, the ignition position at the commencement of the start can be made different from an ignition position after initial explosion, and the ignition position at the commencement of the start and the ignition position after initial explosion can be set in optimum positions. This can improve startability of the engine, and stabilize rotation of the engine in a process of shifting to idling after the start of the engine.

In a further preferred aspect of the present invention, the start time ignition control means further includes ignition permission and prevention means for permitting generation of the ignition signal at the start when a ratio $T_0/T_1$ between time $T_0$ between the detection of the generation position of the second negative voltage and the detection of the next generation position of the first negative voltage and time $T_1$ between the detection of the generation position of the first negative voltage and the detection of the generation position of the second negative voltage is equal to or larger than a set value, and preventing the generation of the ignition signal at the start when the ratio $T_0/T_1$ is smaller than the set value.

The start time ignition control means includes the above described ignition permission and prevention means, and thus the ignition operation can be prevented when a cranking speed is insufficient because of an insufficient operation force after the commencement of the start operation, thereby preventing a phenomenon in which a piston cannot exceed the top dead center and is pushed back when the engine is manually started using a recoil starter or a kick starter.

The ignition permission and prevention means may be comprised so as to permit generation of the ignition signal at the start when the time $T_1$ between the detection of the generation position of the first negative voltage and the detection of the generation position of the second negative voltage is equal to or shorter than a set value, and prevent the generation of the ignition signal at the start when the time $T_1$ exceeds the set value.

As described above, according to the present invention, the idling time advance angle control means is provided for controlling the generation position of the ignition signal to advance the ignition position during idling immediately after completion of the start of the internal combustion engine from the ignition position during idling in normal operation when it is determined that the internal combustion engine has completed the start, and the idling time advance angle control permission condition determination means determines that the condition for performing the idling time advance angle control is met. This can prevent a reduction in rotational speed of the engine during idling immediately after completion of the start and maintain rotation of the engine, thereby allowing idling immediately after the start of the engine to be stabilized in a short time even in cold climates or the like where the rotation of the engine becomes unstable.

In the present invention, the idling time advance angle control is performed only when the predetermined idling time advance angle control permission condition is met, thereby preventing an unnecessary increase in idling speed immediately after the start.

Particularly, in the present invention, in the case where the idling time advance angle control is performed only until the rotational speed of the internal combustion engine is equal to or higher than the idling time advance angle control determination speed continuously for a set determination time, or the case where the idling time advance angle control is performed only when the period in which the rotational speed of the internal combustion engine is continuously equal to or higher than the set idling time advance angle control determination speed does not reach the set certain period, and the number of ignitions by the idling time advance angle control means is equal to or smaller than the set value, the idling time advance angle control is performed to reliably prevent a rapid increase in the rotational speed of the engine, thereby allowing the idling immediately after the start of the engine to be stabilized in a short time without providing uncomfortable feeling to a driver.

In the present invention, the time between the detection of the generation position of the first negative voltage and the detection of the generation position of the second negative voltage is measured in the generation position of the second negative voltage, the time data for detecting the ignition position at the start of the engine is calculated using information on the rotational speed of the engine obtained from the measured time, and measurement of the time data is immediately started to detect the ignition position at the start and generate the ignition signal at the start. Thus, the ignition position at the start can be precisely determined based on the rotational speed information of the engine calculated immediately before the ignition position at the start of the engine when the rotational speed of the crankshaft of the engine minutely varies, thereby stabilizing rotation of the engine, and increasing startability of the engine.

BRIEF DESCRIPTION OF THE DRAWINGS

The above and other objects and features of the invention will be apparent from the detailed description of the preferred embodiments of the invention, which is described and illustrated with reference to the accompanying drawings, in which;

FIGS. 4A and 4B are waveform charts showing a waveform of an output voltage of an exciter coil and a waveform of a rectangular wave signal obtained from a waveform shaping circuit for illustrating a method of identifying a generation position of a negative voltage output by the exciter coil in the embodiment of the present invention;

FIGS. 5A and 5B are waveform charts showing a waveform of an output voltage of the exciter coil and a waveform of a rectangular wave signal used for illustrating an operation at the start of the engine in the embodiment of the present invention;

FIGS. 6A and 6B are waveform charts of an output voltage of the exciter coil and a rectangular wave signal used for illustrating an operation of idling time advance angle control performed in the embodiment of the present invention;

FIGS. 7A and 7B are waveform charts of an output voltage of the exciter coil and a rectangular wave signal used for illustrating control in normal operation in the embodiment of the present invention;

DETAILED DESCRIPTION OF THE PREFERRED EMBODIMENTS

Now, preferred embodiments of the present invention will be described with reference to the drawings.

Figure 1:
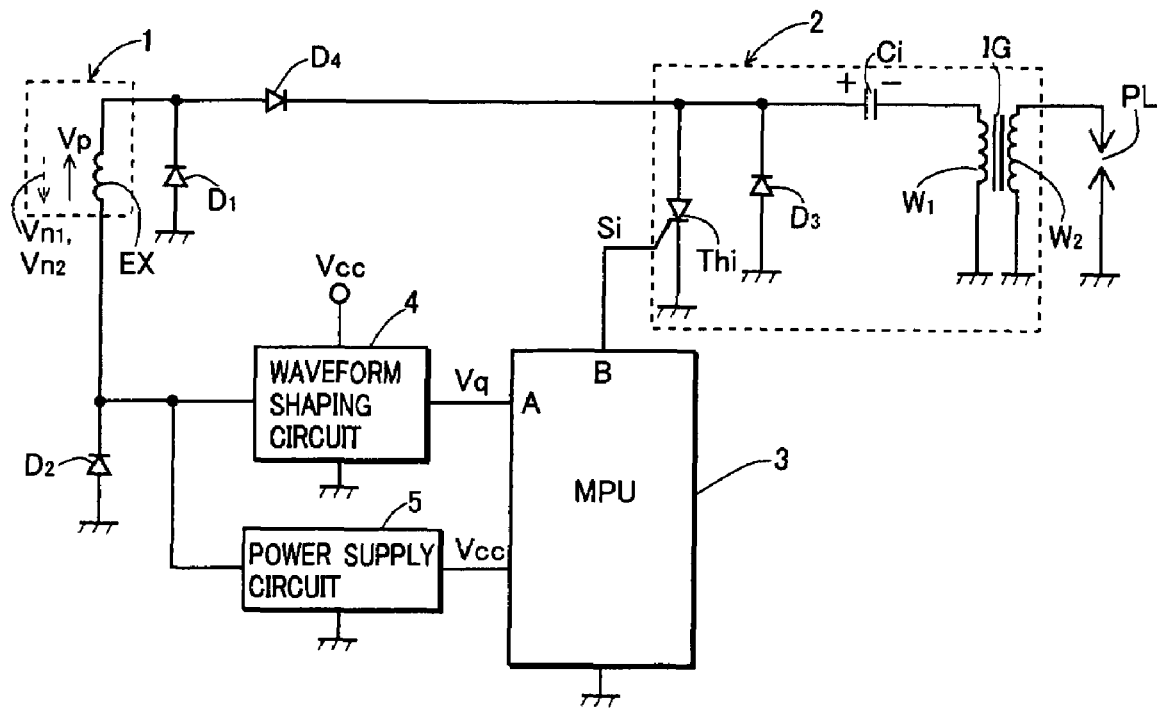
FIG. 1 is a schematic circuit diagram of an exemplary construction of hardware of an ignition device according to the present invention.

FIG. 1 schematically shows a construction of hardware of the embodiment. In FIG. 1, 1 denotes a magneto generator driven by an unshown internal combustion engine, 2 denotes a capacitor discharge ignition circuit, 3 denotes a microprocessor, 4 denotes a waveform shaping circuit, 5 denotes a power supply circuit that supplies a power supply voltage Vcc to the microprocessor 3 and the waveform shaping circuit 4.

Figure 2A:
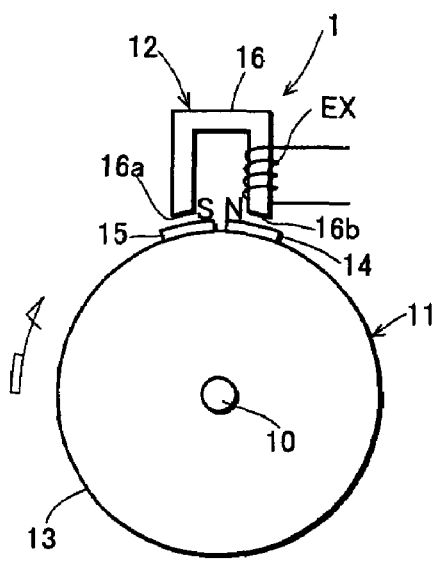
FIGS. 2A and 2B are schematic block diagrams of different exemplary constructions of magnet type AC generators that can be used in the present invention.

As shown in FIG. 2A, the magnet type AC generator 1 used in the embodiment is comprised of a magnet rotor 11 mounted to a crankshaft 10 of an internal combustion engine (not shown), and a stator 12. The magnet rotor 11 is comprised of an aluminum flywheel 13 mounted to the crankshaft 10, permanent magnets 14 and 15 magnetized radially of the flywheel and molded in the flywheel 13 with a north pole and a south pole exposed to the outside, and an unshown magnetic path forming member molded in the flywheel 13 together with the permanent magnets 14 and 15 and connecting between the south pole of the permanent magnet 14 and the north pole of the permanent magnet 15. The stator 12 is comprised of a Π-shaped armature core 16 having, at opposite ends, magnetic pole portions 16a and 16b that face the magnetic poles of the magnets 14 and 15, and an exciter coil EX wound around the armature core 16, and secured to a stator mounting portion provided in a case or a cover of the internal combustion engine.

As shown in FIG. 4A, the exciter coil EX generates an AC voltage once for one turn of a crankshaft of the engine in forward rotation of the internal combustion engine, the AC voltage having a half wave of a positive voltage $V_{p1}$, and a half wave of first and second negative voltages $V_{n1}$ and $V_{n2}$ generated before and after the half wave of the positive voltage $V_{p1}$. The exciter coil EX used in the embodiment further generates a positive voltage $V_{p0}$ having a lower peak value than the positive voltage $V_{p1}$ prior to the first negative voltage $V_{n1}$. In the embodiment, a mounting position of the stator 12 is set so that the second negative voltage $V_{n2}$ is generated in a position sufficiently advanced from a top dead center position (a crank angle position when a piston of the engine reaches a top dead center) TDC of the engine.

One end of the exciter coil EX is connected to a cathode of a diode $D_1$ having a grounded anode, and the other end of the exciter coil is similarly connected to a cathode of a diode $D_2$ having a grounded anode. The ignition circuit 2 in FIG. 1 is comprised of an ignition coil IG in which one ends of a primary coil $W_1$ and a secondary coil $W_2$ are grounded, an ignition capacitor Ci having one end connected to a non-ground terminal of the primary coil of the ignition coil IG, a thyristor $T_{hi}$ as a discharge switch connected between the other end of the ignition capacitor Ci and the ground with a cathode directed to the ground, and a diode $D_3$ connected in anti-parallel with opposite ends of the thyristor $T_{hi}$ for extending a discharge time of ignition spark. When one end of the exciter coil EX is connected to the other end of the ignition capacitor Ci through a diode $D_4$ having an anode directed to the exciter coil, and the exciter coil outputs a positive voltage, a current passes through a capacitor charging circuit comprised of a circuit of the exciter coil EX—the diode $D_4$—the ignition capacitor Ci—the primary coil $W_1$ of the ignition coil—the diode $D_2$—the exciter coil EX, and the ignition capacitor Ci is charged to the shown polarity.

A gate of the thyristor $T_{hi}$ that constitutes the discharge switch is connected to a port B of the microprocessor 3. As described later, the microprocessor 3 obtains rotation information of the internal combustion engine from a negative voltage of the exciter coil EX to determine an ignition position (a crank angle position where an ignition operation is performed) of the internal combustion engine, and provides an ignition signal Si from the port B to the gate of the thyristor $T_{hi}$ when the determined ignition position is detected.

When the ignition signal Si is provided to the thyristor $T_{hi}$, the thyristor $T_{hi}$ conducts and discharges charges accumulated in the ignition capacitor Ci through the primary coil $W_1$ of the ignition coil. Thus, a high voltage is induced in the primary coil of the ignition coil IG, this voltage is further increased by a ratio of voltage increase between the primary and secondary coils of the ignition coil, and high voltage for ignition is induced in the secondary coil $W_2$ of the ignition coil. This high voltage is applied to an ignition plug PL mounted to a cylinder of the internal combustion engine, and thus spark discharge occurs in the ignition plug to ignite the engine.

In the embodiment, the internal combustion engine is a single cylinder engine for simplicity of description. In the case of a multi-cylinder engine, for example, ignition circuits 2 of the number of cylinders are provided, stators including an exciter coil EX of the number of cylinders are provided, and an ignition capacitor of an ignition circuit for each cylinder is charged by a positive voltage output by an exciter coil for each cylinder. In this case, rotation information for each cylinder is provided from the exciter coil for each cylinder to the microprocessor 3, and an ignition signal is provided from the microprocessor 3 to a thyristor of the ignition circuit for each cylinder in an ignition position of each cylinder.

In the case of a two-cylinder internal combustion engine, an ignition device may be comprised so that one end and the other end of a secondary coil $W_2$ of an ignition coil IG are connected to non-ground terminals of ignition plugs of different cylinders, and spark discharge is simultaneously caused in the ignition plugs of the two cylinders of the engine.

The power supply circuit 5 is comprised of a circuit that charges a power supply capacitor with the negative voltage output by the exciter coil EX, and a regulator that controls a voltage across the power supply capacitor at a constant value, and supplies a power supply voltage to the microprocessor 3 and the waveform shaping circuit 4. The waveform shaping circuit 4 in FIG. 1 is a circuit that converts the negative voltages $V_{n1}$ and $V_{n2}$ output by the exciter coil EX to a signal recognizable by the microprocessor 3. As shown in FIG. 4B, the waveform shaping circuit 4 in the embodiment shapes a waveform of a negative half wave voltage generated by the exciter coil EX and maintains a low level (L level) while the negative voltages $V_{n1}$ and $V_{n2}$ are generated, generates a rectangular wave signal Vq that maintains a high level (H level) when the negative voltages $V_{n1}$ and $V_{n2}$ are not generated, and inputs a trailing edge of the rectangular wave signal Vq in a port A of the microprocessor 3 as a crank signal. Such a rectangular wave signal can be obtained, for example, across switch means that maintains an ON state while the negative voltages $V_{n1}$ and $V_{n2}$ are generated.

The rectangular wave signal Vq has a trailing edge in the generation position of the first negative voltage $V_{n1}$ and the generation position of the second negative voltage $V_{n2}$ output by the exciter coil, and a leading edge in a position where the first negative voltage $V_{n1}$ and the second negative voltage disappear. In the embodiment, the trailing edge of the rectangular wave signal Vq that appears twice during one turn of the crankshaft of the engine is recognized as a crank signal by the microprocessor to obtain rotation information of the engine. The generation position of the first negative voltage $V_{n1}$ (the generation position of the first crank signal) and the generation position of the second negative voltage $V_{n2}$ (the generation position of the second crank signal) are denoted by reference characters $CR_{in}$ and $CR_{out}$ to identify the generation positions of the two negative voltages (the generation positions of the crank signal).

In the embodiment, the generation position $CR_{in}$ of the first negative voltage $V_{n1}$ is used as a reference crank angle position for determining timing for capturing time data for calculating the rotational speed of the engine, and starting measurement of the ignition position in normal operation of the engine, and the generation position $CR_{out}$ of the second negative voltage $V_{n2}$ is used as a position for starting measurement of the ignition position at the start of the engine.

The microprocessor 3 executes a predetermined program to construct various function achieving means, and constructs an ignition control portion that provides an ignition signal to the discharge switch in the ignition position of the internal combustion engine.

Figure 3:
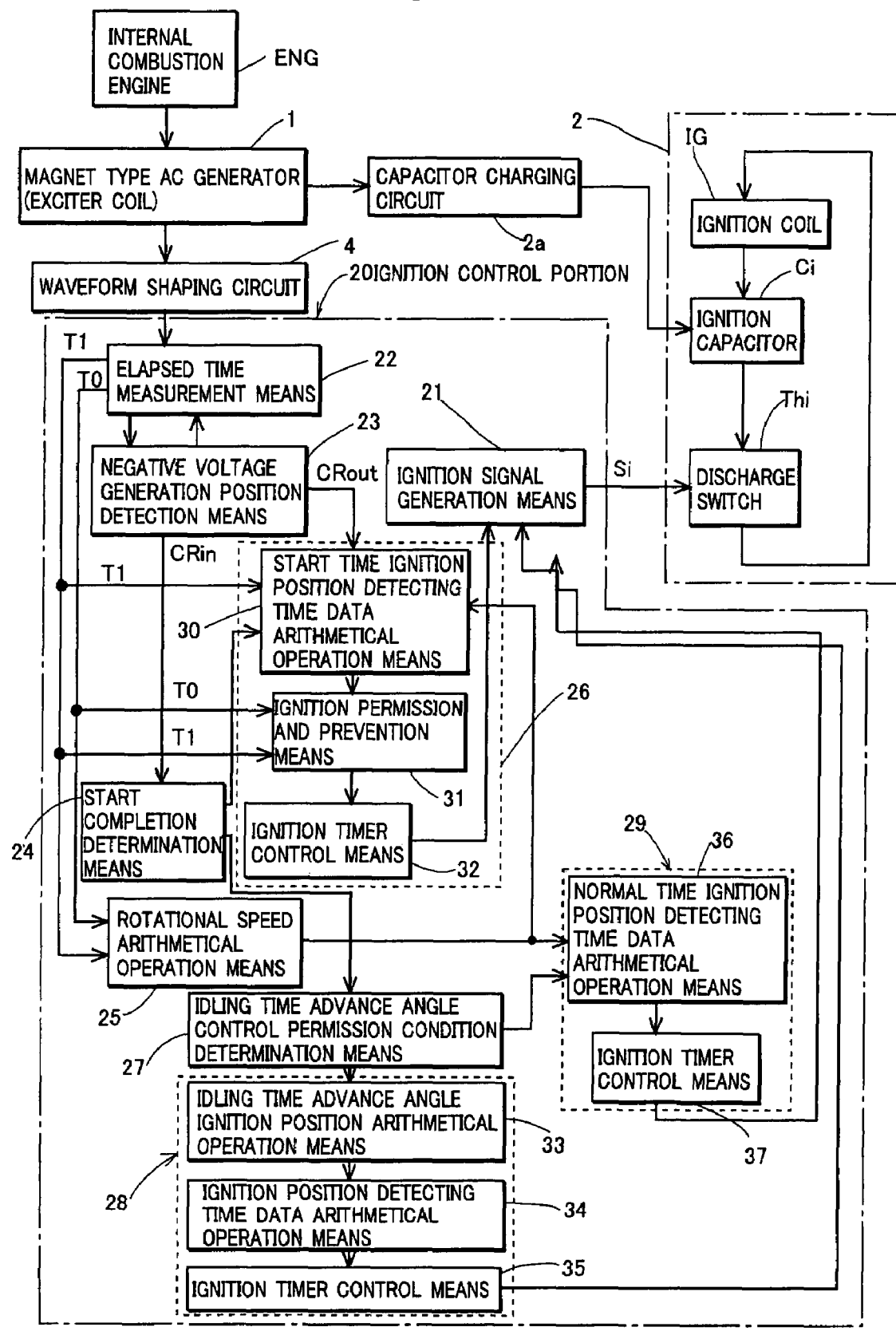
FIG. 3 is a block diagram of an entire construction including a construction of an ignition control portion in a first embodiment of the present invention.

FIG. 3 is a block diagram of an exemplary construction of the ignition control portion. In FIG. 3, 1 denotes the magnet type AC generator comprised as shown in FIG. 2A and driven by an internal combustion engine ENG, 2 denotes the ignition circuit including the ignition coil IG, the ignition capacitor Ci, and the discharge switch $T_{hi}$ comprised of the thyristor, and 2a denotes a capacitor charging circuit that charges the ignition capacitor Ci with a positive voltage of the exciter coil provided in the magnet type AC generator.

20 denotes the ignition control portion, and the ignition control portion is comprised of ignition signal generation means 21, elapsed time measurement means 22, negative voltage generation position detection means 23, start completion determination means 24, rotational speed arithmetical operation means 25, start time ignition control means 26, idling time advance angle control permission condition determination means 27, idling time advance angle control means 28, and normal operation time ignition control means 29.

In more detail, the ignition signal generation means 21 includes an ignition timer that measures ignition position detecting time data, and generates an ignition signal Si when the ignition timer completes measurement of the ignition position detecting time data.

The elapsed time measurement means 22 measures an elapsed time between detection of the last trailing edge (crank signal) of the rectangular wave signal Vq output by the waveform shaping circuit 4 and detection of this trailing edge (crank signal). The elapsed time measurement means 22 is comprised so as to read a measurement value of the timer in the microprocessor for each detection of the trailing edge of the rectangular wave signal Vq output by the waveform shaping circuit 4, and detect time between the detection of the last trailing edge ($CR_{in}$ or $CR_{out}$) of the rectangular wave signal Vq and the detection of this trailing edge ($CR_{out}$ or $CR_{in}$).

The negative voltage generation position detection means 23 detects the generation position $CR_{in}$ of the first negative voltage $V_{n1}$ and the generation position $CR_{out}$ of the second negative voltage $V_{n2}$. The negative voltage generation position detection means 23 detects the generation position $CR_{in}$ of the first negative voltage $V_{n1}$ and the generation position $CR_{out}$ of the second negative voltage $V_{n2}$ from a difference in length between time $T_1$ between the detection of the generation position $CR_{in}$ of the first negative voltage $V_{n1}$ and the generation position $CR_{out}$ of the second negative voltage and time $T_0$ between the detection of the generation position $CR_{out}$ of the second negative voltage and detection of the next generation position $CR_{in}$ of the first negative voltage.

The shown negative voltage generation position detection means 23 compares time $T_{old}$ detected last time by the elapsed time measurement means 22 with time $T_{new}$ detected this time (see FIG. 4), detects that this trailing edge position of the rectangular wave signal is the generation position of the first negative voltage $V_{n1}$ when the relationship of $T_{new} < T_{old}/k$ (k is a constant equal to or larger than one) is not met, and detects that this trailing edge position of the rectangular wave signal is the generation position of the second negative voltage $V_{n2}$ when the relationship of $T_{new} < T_{old}/k$ is met. The elapsed time measurement means 22 recognizes that the elapsed time captured this time is $T_0$ when the negative voltage generation position detection means 23 detects the generation position of the first negative voltage (the crank signal $CR_{in}$), and recognizes that the elapsed time captured this time is $T_1$ when the negative voltage generation position detection means 23 detects the generation position of the second negative voltage (the crank signal $CR_{out}$).

The start completion determination means 24 determines whether the internal combustion engine is at the start or has completed the start. The shown start completion determination means 24 is comprised so as to detect the number of rotations Pulse_cnt of the crankshaft of the engine after the commencement of the start operation of the internal combustion engine from the number of detections of the generation position ($CR_{in}$) of the first negative voltage $V_{n1}$, determines that the internal combustion engine is at the start (the start has not been completed) when the number of rotations Pulse_cnt is equal to or smaller than a set value STARTNUM (when Pulse_cnt≦STARTNUM), and determines that the internal combustion engine has completed the start when the number of rotations Pulse_cnt of the crankshaft of the engine is larger than the set value STARTNUM (when STARTNUM<Pulse_cnt) after the commencement of the start operation of the internal combustion engine.

The rotational speed arithmetical operation means 25 arithmetically operates the rotational speed of the internal combustion engine from a cycle $T_2$ of detection of the generation position $CR_{in}$ of the first negative voltage $V_{n1}$. The shown rotational speed arithmetical operation means 25 adds the times $T_0$ and $T_1$ measured by the elapsed time measurement means 22 for each detection of the generation position $CR_{in}$ of the first negative voltage, calculates the elapsed time $T_2$ (the cycle of detection of the generation position $CR_{in}$ of the first negative voltage) between the last detection of the generation position $CR_{in}$ of the first negative voltage and this detection of the generation position $CR_{in}$ of the first negative voltage, and arithmetically operates the rotational speed of the engine from the elapsed time $T_2$.

The start time ignition control means 26 controls the generation position of the ignition signal when the start completion determination means 24 determines that the internal combustion engine is at the start. The start time ignition control means performs a process of arithmetically operating time $T_{igs}$ required for the internal combustion engine to rotate from the generation position of the second negative voltage $V_{n2}$ to an ignition position $\theta_{igs}$ suitable at the start (see FIG. 5) at the rotational speed of the internal combustion engine calculated from the time $T_1$ between the detection of the generation position of the first negative voltage $V_{n1}$ and the detection of the generation position of the second negative voltage $V_{n2}$ and an angle (determined by a construction of the generator) between the generation position of the first negative voltage $V_{n1}$ and the generation position of the second negative voltage $V_{n2}$ when the start completion determination means 24 determines that the internal combustion engine is at the start, as ignition position detecting time data, and causing the ignition timer to immediately start measurement of the ignition position detecting time data $T_{igs}$, when the generation position of the second negative voltage $V_{n2}$ is detected, and controls the ignition position of the internal combustion engine to a position suitable at the start.

The shown start time ignition control means 26 is comprised of start time ignition position detecting time data arithmetical operation means 30 for arithmetically operating time required for the internal combustion engine to rotate from the generation position of the second negative voltage to the ignition position suitable at the start at the rotational speed of the internal combustion engine calculated from the elapsed time $T_1$ between the detection of the generation position $CR_{in}$ of the first negative voltage $V_{n1}$ and the detection of the generation position $CR_{out}$ of the second negative voltage $V_{n2}$ and the angle α (see FIG. 5) between the generation position $CR_{in}$ of the first negative voltage and the generation position $CR_{out}$ of the second negative voltage, as the ignition position detecting time data $T_{igs}$, ignition permission and prevention means 31, and ignition timer control means 32 for setting the ignition position detecting time data $T_{igs}$ in the ignition timer that constitutes the ignition signal generation means 21 to start the measurement.

The start time ignition position detecting time data $T_{igs}$ is arithmetically operated by the following equation $$T_{igs}=T_1 \cdot (\theta_{out}-\theta_{igs})/\alpha \qquad (1)$$

where $\theta_{out}$ is an angle between the top dead center position TDC and the generation position $CR_{out}$ of the second negative voltage $V_{n2}$, and the ignition position $\theta_{igs}$ at the start is expressed by an advance angle measured on the advance side from the top dead center position TDC.

The ignition permission and prevention means 31 determines whether the ignition operation is permitted or prevented at the start of the engine. The ignition permission and prevention means 31 permits the ignition timer control means 32 to set the time data in the ignition timer and permits generation of the ignition signal at the start when a ratio $T_0/T_1$ between the time $T_0$ between the detection of the generation position $CR_{out}$ of the second negative voltage and the detection of the next generation position $CR_{in}$ of the first negative voltage and the time $T_1$ between the detection of the generation position $CR_{in}$ of the first negative voltage and the detection of the generation position $CR_{out}$ of the second negative voltage is equal to or higher than a set value (when a cranking speed is sufficiently high), and prevents the ignition timer control means 32 to set the time data in the ignition timer and prevents generation of the ignition signal when the ratio $T_0/T_1$ is lower than the set value (when the cranking speed is too low).

In the embodiment, two ignition positions: an ignition position (a position near the top dead center position) $\theta_{igs1}$ suitable at the commencement of the start, and an ignition position (a position slightly advanced from the top dead center position) $\theta_{igs2}$ suitable as an ignition position in shifting to idling after the commencement of the start are previously set as ignition positions suitable at the start and stored in a ROM. The start time ignition position detecting time data arithmetical operation means 30 selects an optimum ignition position as $\theta_{igs}$ between the two ignition positions $\theta_{ig1}$ and $\theta_{ig2}$ set as the ignition positions suitable at the start, according to the rotational speed arithmetically operated by the rotational speed arithmetical operation means 25, and arithmetically operates the start time ignition position detecting time data $T_{igs}$ by the equation (1). When the start time ignition position detecting time data $T_{igs}$ is arithmetically operated, the ignition timer control means 32 immediately sets the time data $T_{igs}$ in the ignition timer and starts measurement thereof.

The process between capturing the time $T_1$ and arithmetically operating the start time ignition position detecting time data $T_{igs}$ is performed instantaneously, and thus the measurement of the time data $T_{igs}$ can be considered to be started in the generation position $CR_{out}$ of the second negative voltage $V_{n2}$. Thus, at the start of the engine, as shown in FIG. 5, the ignition signal is provided to the thyristor $T_{hi}$ of the ignition circuit 2 to perform the ignition operation in the crank angle position $\theta_{igs}$ at the time when time provided by the start time ignition position detecting time data $T_{igs}$ has elapsed from the time of the detection of the generation position $CR_{out}$ of the second negative voltage $V_{n2}$.

The idling time advance angle control permission condition determination means 27 determines whether an idling time advance angle control permission condition is met that is a condition for permitting idling time advance angle control to advance the ignition position during idling immediately after completion of the start of the internal combustion engine from the ignition position during idling in normal operation in order to stabilize idling immediately after completion of the start of the internal combustion engine.

In the embodiment, the idling time advance angle control permission condition determination means is comprised so as to determine that the idling time advance angle control permission condition is met when the number of ignitions by the idling time advance angle control means 28 is equal to or smaller than a set value, and determine that the idling time advance angle control permission condition is not met when the number of ignitions by the idling time advance angle control means 28 exceeds the set value.

Specifically, in the embodiment, the idling time advance angle control is restricted by the number of ignitions so that the idling time advance angle control is finished when the number of ignitions by the idling time advance angle control reaches the set value.

The idling time advance angle control means 28 controls the generation position of the ignition signal so as to advance the ignition position during idling immediately after completion of the start of the internal combustion engine from the ignition position during idling in normal operation when the idling time advance angle control permission condition determination means 27 determines that the idling time advance angle control permission condition is met (the idling time advance angle control is permitted).

The shown idling time advance angle control means 28 is comprised of idling time advance angle ignition position arithmetical operation means 33 for arithmetically operating an ignition position $\theta_{igi}$ (see FIG. 6) for the idling time advance angle control at an idling speed of the internal combustion engine calculated from the cycle $T_2$ of the detection of the generation position $CR_{in}$ of the first negative voltage $V_{n1}$, as a position advanced from the ignition position at the idling speed in normal operation of the internal combustion engine; ignition position detecting time data arithmetical operation means 34 for idling time advance angle control for arithmetically operating time required for the internal combustion engine to rotate from the generation position of the first negative voltage $V_{n1}$ to the idling time advance angle controlling ignition position $\theta_{igi}$ at the idling speed of the internal combustion engine calculated from the cycle $T_2$ of the detection of the generation position $CR_{in}$ of the first negative voltage $V_{n1}$, as ignition position detecting time data $T_{igi}$; and ignition timer control means 35 for setting the ignition position detecting time data $T_{igi}$ in the ignition timer when the generation position of the first negative voltage $V_{n1}$ is detected and starting measurement of the time data $T_{igi}$. The idling time advance angle control means 28 performs control to advance the ignition position during idling immediately after completion of the start from the ignition position during idling in normal operation when the idling time advance angle control permission condition is met.

The idling time advance angle ignition position arithmetical operation means 33 used in the embodiment searches an ignition position arithmetical operation map for normal operation for arithmetically operating the ignition position in normal operation with respect to the idling speed of the internal combustion engine calculated from the cycle $T_2$ of the detection of the generation position $CR_{in}$ of the first negative voltage $V_{n1}$, and arithmetically operates the idling time advance angle controlling ignition position $\theta_{igi}$ by adding a certain advance angle to an advance angle (an angle measured on the advance side from the top dead center) that provides an ignition position at the idling speed in normal operation.

The normal operation time ignition control means 29 controls the generation position of the ignition signal so that when the start completion determination means 24 determines that the internal combustion engine has completed the start, and the idling time advance angle control permission condition determination means 27 determines that the idling time advance angle control permission condition is not met, the ignition position is set in a position suitable in normal operation of the internal combustion engine.

The normal operation time ignition control means 29 is comprised so as to perform a process of arithmetically operating an ignition position $\theta_{ign}$ in normal operation of the internal combustion engine with respect to the rotational speed of the internal combustion engine calculated from the cycle $T_2$ of the detection of the generation position $CR_{in}$ of the first negative voltage $V_{n1}$, a process of arithmetically operating time required for the engine to rotate from the generation position of the first negative voltage $V_{n1}$ to the arithmetically operated ignition position $\theta_{ign}$ in normal operation at the rotational speed of the internal combustion engine calculated from the cycle $T_2$, as ignition position detecting time data $T_{ign}$ (see FIG. 7), and a process of causing the ignition timer to start measurement of the ignition position detecting time data $T_{ign}$, when the generation position of the first negative voltage is detected.

The shown normal operation time ignition control means 29 is comprised of ignition position arithmetical operation means (not shown) for arithmetically operating the ignition position $\theta_{ign}$ in normal operation of the internal combustion engine with respect to the rotational speed arithmetically operated by the rotational speed arithmetical operation means 25 using the cycle $T_2$ detected one turn before, normal time ignition position detecting time data arithmetical operation means 36 for arithmetically operating time required for the engine to rotate from the generation position $CR_{in}$ of the first negative voltage to the arithmetically operated ignition position $\theta_{ign}$ in normal operation at the present rotational speed of the internal combustion engine calculated from a newly measured cycle $T_2$, as ignition position detecting time data $T_{ign}$, and ignition timer control means 37 for setting the measurement of the arithmetically operated ignition position detecting time data $T_{ign}$ in the ignition timer that constitutes the ignition signal generation means 21.

The normal operation time ignition position detecting time data $T_{ign}$ is arithmetically operated by the following equation $$T_{ign} = T_2 \cdot (\theta_{in} - \theta_{ign})/360 \qquad (2)$$

where $\theta_{in}$ is an angle between the top dead center position TDC and the generation position $CR_{in}$ of the first negative voltage $V_{n1}$, and the ignition position $\theta_{ign}$ is expressed by an angle measured on the advance side from the top dead center position.

The ignition timer control means 37 sets the ignition position detecting time data $T_{ign}$ in the ignition timer that constitutes the ignition signal generation means 21 and starts the measurement thereof. The ignition signal generation means 21 provides the ignition signal Si to the discharge switch and causes the ignition circuit 2 to perform the ignition operation when the ignition timer completes the measurement of the set time data $T_{ign}$.

Thus, in normal operation of the engine, as shown in FIG. 7, the ignition signal Si is provided to the thyristor $T_{hi}$ of the ignition circuit in the crank angle position $\theta_{ign}$ at the time when time provided from the normal operation time ignition position detecting time data $T_{ign}$ has passed from the time when the generation position $CR_{in}$ of the first negative voltage $V_{n1}$ is detected, to perform the ignition operation. The ignition position $\theta_{ign}$ changes with changes in control conditions such as the rotational speed of the engine.

In FIGS. 5 to 7, $\theta_{imax}$ denotes a maximum advance angle position of the ignition position in normal operation. In order to perform the ignition operation in the maximum advance angle position without problems, in the maximum advance angle position $\theta_{imax}$, the relationship between a phase of the output voltage of the exciter coil and the maximum advance angle position is set so that an instantaneous value of the positive voltage $V_{p1}$ of the exciter coil has a value that can charge the ignition capacitor Ci to a voltage value that allows the ignition operation. In the embodiment, a peak position of the positive voltage $V_{p1}$ output by the exciter coil is set to be the maximum advance angle position.

Figure 8:
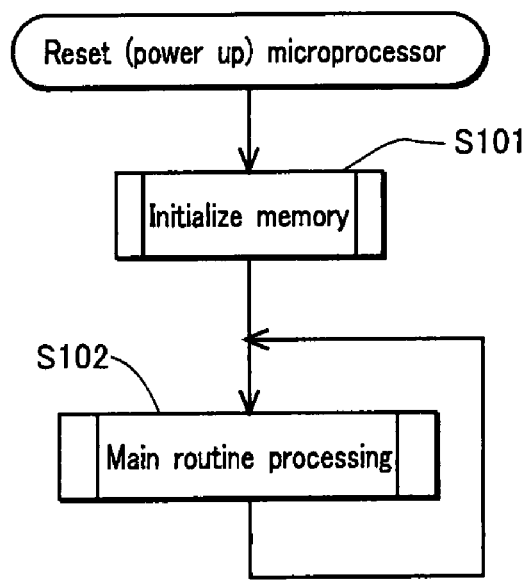
FIG. 8 is a flowchart showing an algorithm of a processing executed when a microprocessor is powered on in the first embodiment in FIG. 3.

In the embodiment, FIGS. 8 to 13 show algorithms of essential portions of programs executed by the microprocessor 3. FIG. 8 shows an algorithm of a processing executed when the microprocessor is reset (powered up). In this processing, first in Step S101, a memory is initialized, then the process moves to Step S102, and a processing of a main routine is performed.

In the main routine, an arithmetical operation of the ignition position $\theta_{ign}$ in normal time or the like is performed with respect to a rotational speed $N_e$ arithmetically operated in a $CR_{in}$ processing in FIG. 12 described later. The arithmetical operation of the ignition position $\theta_{ign}$ is performed, for example, by searching the ignition position arithmetical operation map stored in the ROM with respect to the rotational speed $N_e$, and performing interpolation of the searched value. Also, an arithmetical operation for correcting the ignition position is performed with respect to other control conditions such as a throttle valve opening as required.

Figure 9:
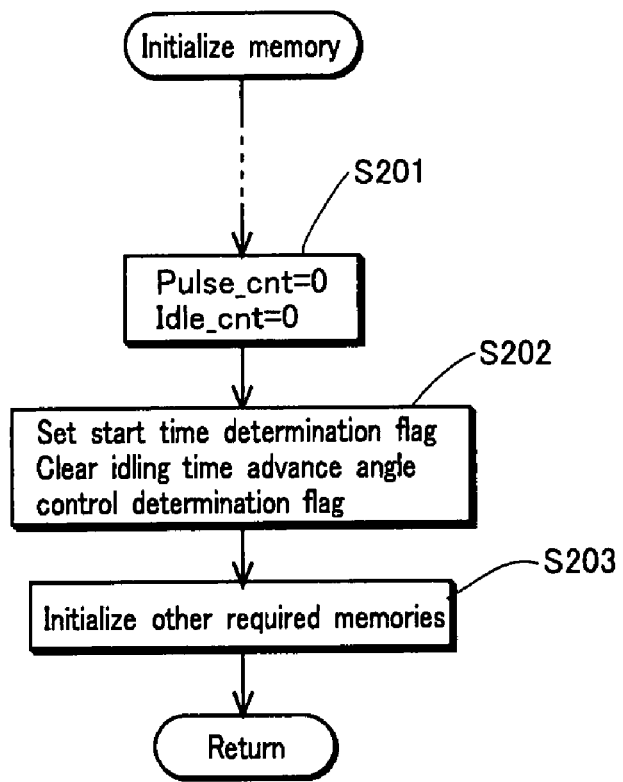
FIG. 9 is a flowchart showing an algorithm of a memory initialization processing executed immediately after activation of the microprocessor in the first embodiment of the present invention.

FIG. 9 shows an algorithm of a memory initialization processing. In this initialization process, first in Step S201, the number of rotations Pulse_cnt of the crankshaft of the engine after the commencement of the start operation of the internal combustion engine is cleared to zero, and a count value Idle_cnt of an idling time advance angle control ignition number counter is cleared to zero. In the embodiment, the number of detections of the generation position ($CR_{in}$) of the first negative voltage $V_{n1}$ is counted as the number of rotations Pulse_cnt. In Step S201, the number of rotations Pulse_cnt and the count value Idle_cnt of the idling time advance angle control ignition number counter are cleared to zero, then in Step S202, a start time determination flag is set to "start time", and an idling time advance angle control determination flag is cleared. In Step S203, other memories are initialized.

Figure 10:
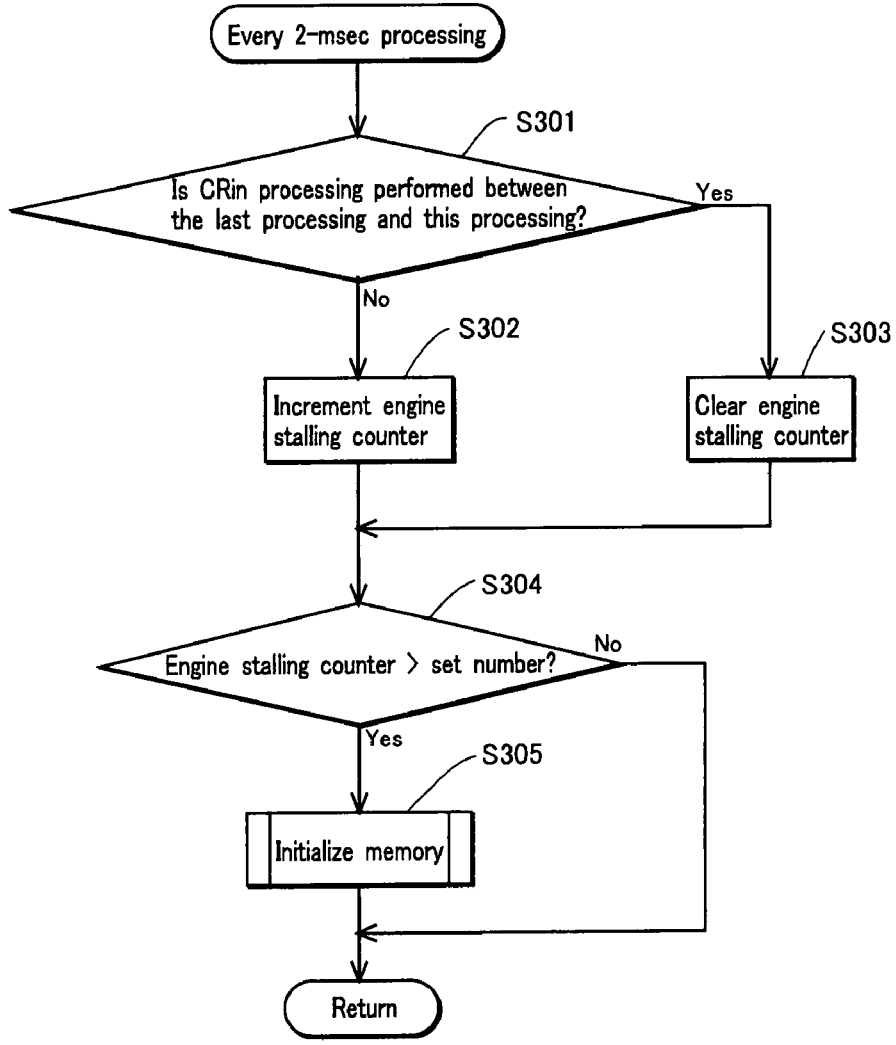
FIG. 10 is a flowchart showing an algorithm of a processing executed by the microprocessor every 2 msec in the first embodiment of the present invention.

FIG. 10 shows an algorithm of an every 2-msec processing (a memory initialization processing in engine stalling) executed every 2 msec by the microprocessor in order to determine whether the internal combustion engine stalls. In this processing, first in Step S301, it is determined whether the $CR_{in}$ processing described later is performed between the last every 2-msec processing and this every 2-msec processing. When it is determined that the $CR_{in}$ processing is not performed between the last every 2-msec processing and this every 2-msec processing, the process moves to Step S302, and the count value of the engine stalling counter that counts the number of engine stalling is incremented. When it is determined in Step S301 that the $CR_{in}$ processing is performed between the last every 2-msec processing and this every 2-msec processing, the process moves to Step S303 and the count value of the engine stalling counter is cleared. After Step S302 or S303, the process moves to Step S304, and it is determined whether the count value of the engine stalling counter exceeds a set number. When it is determined that the count value of the engine stalling counter does not exceed the set number, it is determined the engine does not stall, returning to the main routine. When it is determined in Step S304 that the count value of the engine stalling counter exceeds the set number, the process moves to Step S305, the memory initialization processing in FIG. 9 is performed, then returning to the main routine.

Figure 11:
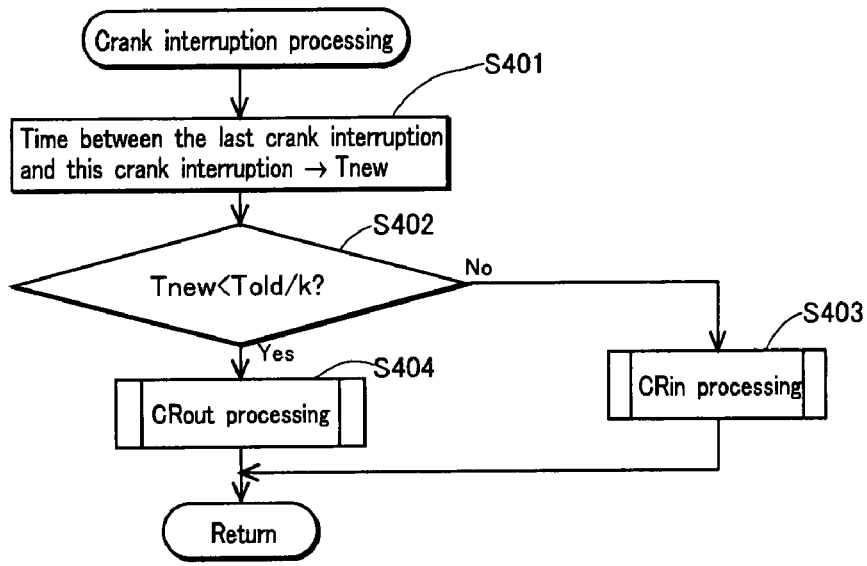
FIG. 11 is a flowchart showing an algorithm of a crank interruption processing executed by the microprocessor for each detection of the generation position of the negative voltage output by the exciter coil in the first embodiment of the present invention.
Figure 12:
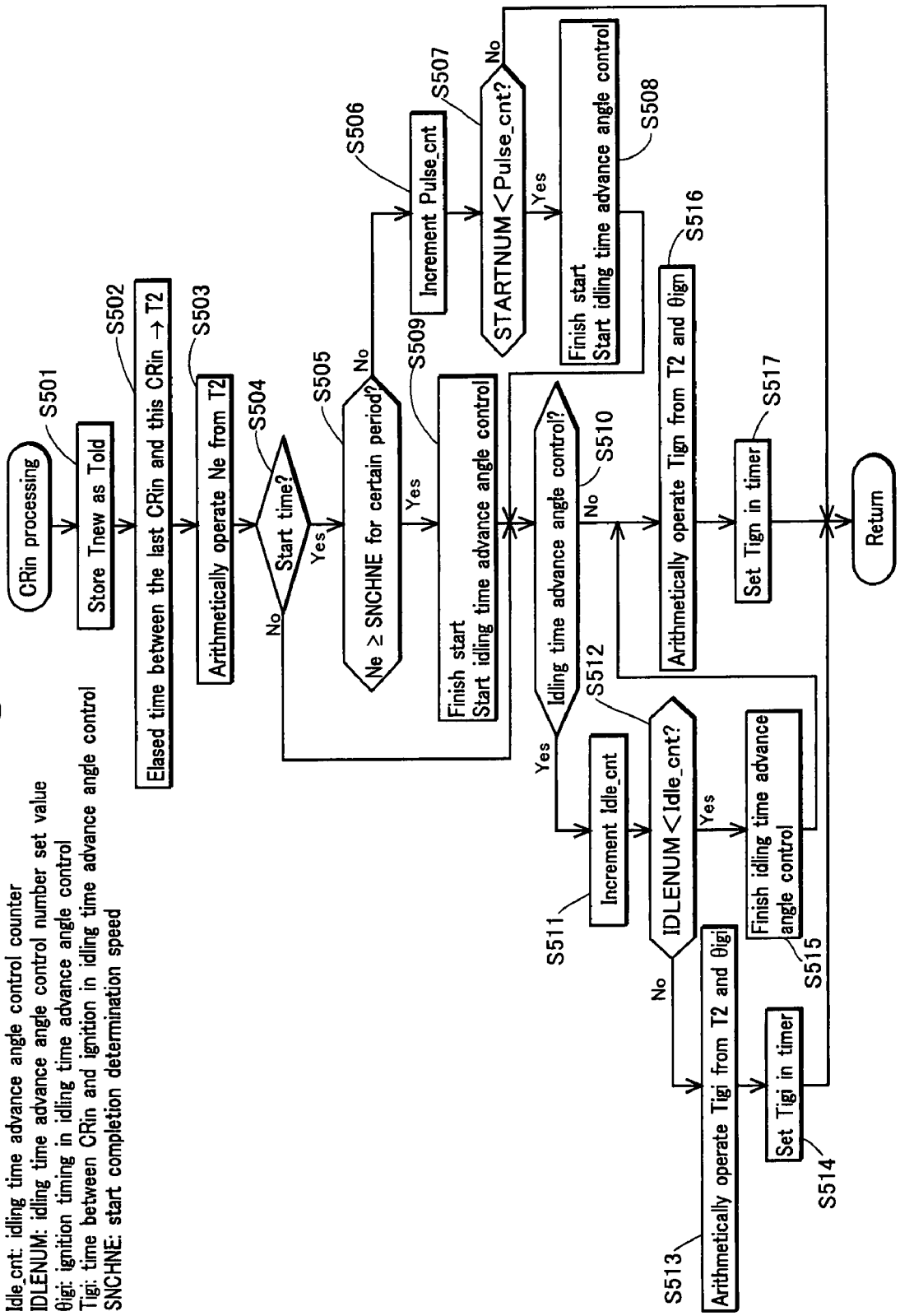
FIG. 12 is a flowchart showing an algorithm of a $CR_{in}$ processing executed by the microprocessor for each detection of a generation position $CR_{in}$ of a first negative voltage output by the exciter coil in the first embodiment of the present invention.
Figure 13:
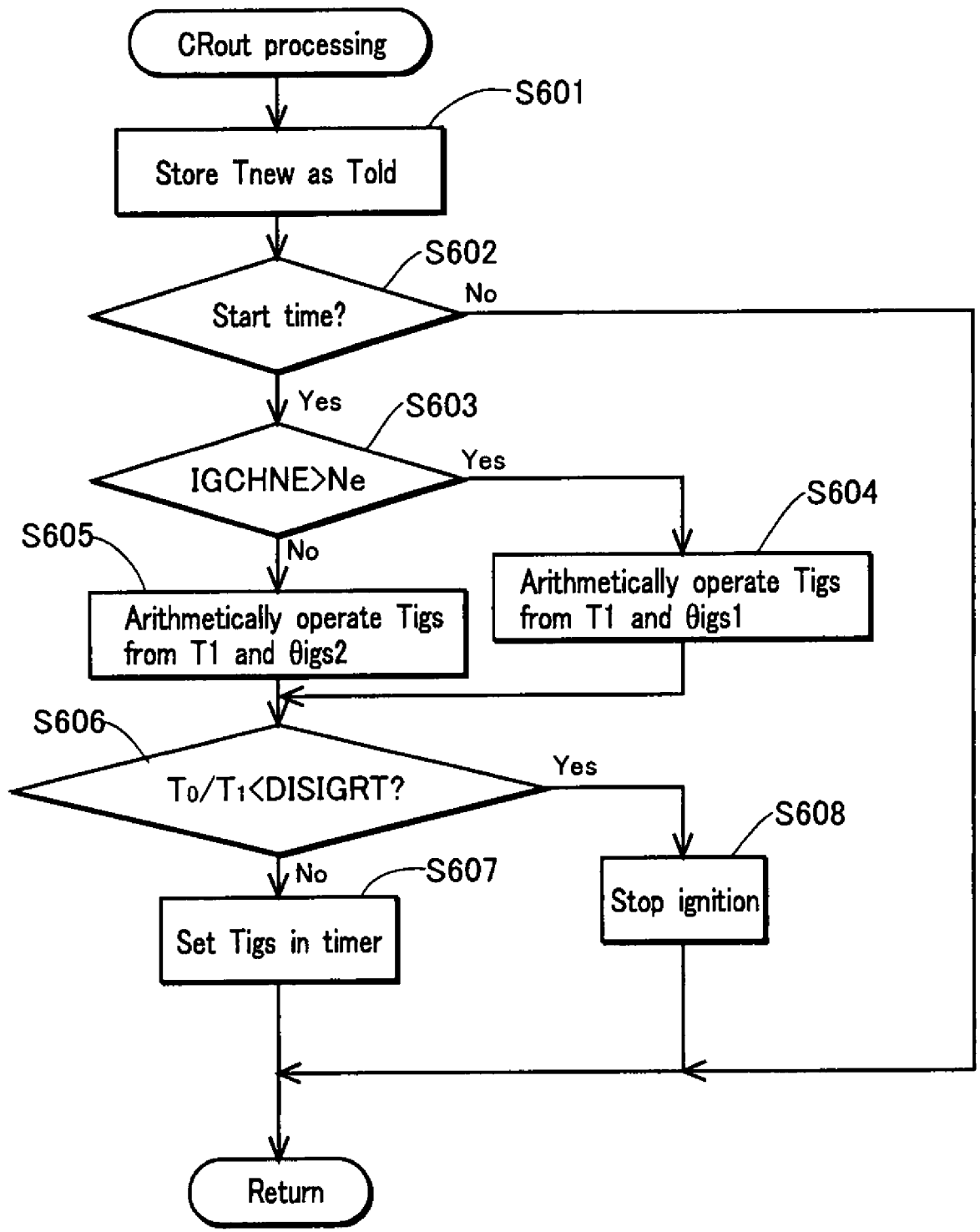
FIG. 13 is a flowchart showing an algorithm of a $CR_{out}$ processing executed by the microprocessor for each detection of a generation position $CR_{out}$ of a second negative voltage output by the exciter coil in the first embodiment of the present invention.

FIG. 11 shows a crank interruption processing performed by the microprocessor for each detection of the trailing edge of the rectangular wave signal output by the waveform shaping circuit 4, and FIG. 12 shows a $CR_{in}$ processing performed when the generation position $CR_{in}$ of the first negative voltage is detected in the crank interruption processing in FIG. 11. FIG. 13 shows a $CR_{out}$ processing performed when the generation position $CR_{out}$ of the second negative voltage is detected in the interruption processing in FIG. 11.

When the crank signal is input to the microprocessor 3 in the generation position $CR_{in}$ of the first negative voltage, and the crank signal is input in the generation position $CR_{out}$ of the second negative voltage, the main routine is interrupted, and the crank interruption processing in FIG. 11 is started. In Step S401 of the interruption processing, time between the last crank interruption processing and this crank interruption processing (an elapsed time between the crank signals) is stored in a RAM as $T_{new}$. Then, the process proceeds to Step S402, the elapsed time $T_{new}$ between crank signals measured this time is compared with time $T_{old}/k$ obtained by multiplying time similarly measured and stored in the last crank interruption processing and determined as $T_{old}$ at the finish of the interruption processing by 1/k. When it is determined from the comparison that $T_{new}<T_{old}/k$ is not met ($T_{new}\geq T_{old}$), it is determined that the crank angle position where this interruption processing is started is the generation position of the first negative voltage (the crank signal generated this time is the first crank signal $CR_{in}$), the process proceeds to Step S403, and the $CR_{in}$ processing in FIG. 12 is performed. When it is determined in Step S402 that $T_{new}<T_{old}/k$ is met, it is determined that the crank angle position where this interruption processing is started is the generation position of the second negative voltage (the crank signal generated this time is the second crank signal $CR_{out}$), the process proceeds to Step S404, and the $CR_{out}$ processing in FIG. 13 is performed. After the finish of the $CR_{out}$ processing or the $CR_{in}$ processing, the interruption processing is finished.

In the $CR_{in}$ processing in FIG. 12, first in Step S501, the time $T_{new}$ measured in Step 1 of the interruption processing in FIG. 11 is stored as $T_{old}$, and in Step S502, an elapsed time between the last $CR_{in}$ processing and this $CR_{in}$ processing is arithmetically operated as $T_2$. Then, in Step S503, the rotational speed $N_e$ of the engine is arithmetically operated from the elapsed time $T_2$ (time required for one turn of the crankshaft), and it is determined in Step S504 whether the start time determination flag is set to "start time". When it is determined in Step S504 that the start time determination flag is set to "start time", the process proceeds to Step S505, and it is determined whether the rotational speed of the engine is equal to or higher than a start completion determination speed SNCHNE continuously for a certain period. When it is determined that the rotational speed of the engine is not equal to or higher than the start completion determination speed continuously for a certain time, the process proceeds to Step S506, the number of rotations Pulse_cnt of the crankshaft after the commencement of the start operation of the engine is incremented by one, and it is determined in Step S507 whether the number of rotations Pulse_cnt exceeds a set number START-NUM. When the number of rotations Pulse_cnt does not exceed the set number STARTNUM, the $CR_{in}$ processing is finished without performing processing thereafter, returning to the main routine.

When it is determined in Step S507 that the number of rotations Pulse_cnt exceeds the set number STARTNUM, in Step S508, the ignition control at the start is finished, the idling time advance angle control flag is set, and the idling time advance angle control is started. When it is determined in Step S505 that the rotational speed of the engine is equal to or higher than the start completion determination speed continuously for a certain period, in Step S509, the start time determination flag is reset to finish the ignition control at the start, and the idling time advance angle control flag is set to start the idling time advance angle control.

When the idling time advance angle control is started in Step S508, when the idling time advance angle control is started in Step S509, and when it is determined in Step S504 that the start time determination flag is not set at the start, then it is determined in S510 whether the idling time advance angle control flag is set (whether idling time advance angle control is performed). When it is determined that the idling time advance angle control flag is set, the process moves to Step S511. In Step S511, the count value Idle_cnt of the idling time advance angle control counter is incremented by one, and then in Step S512, it is determined whether the count value Idle_cnt of the idling time advance angle control counter exceeds an idling time advance angle control number set value IDLENUM. When it is determined that the count value Idle_cnt of the idling time advance angle control counter does not exceed the idling time advance angle control number set value IDLENUM (when the idling time advance angle control permission condition is met), the process proceeds to Step S513, and time required for the crankshaft to rotate from the generation position of the first negative voltage $V_{n1}$ to the ignition position $\theta_{igi}$ is arithmetically operated as the ignition position detecting time data $T_{igi}$ from the rotational speed calculated from the cycle $T_2$ of the detection of the generation position of the first negative voltage $V_{n1}$ and an angle of 360° of one turn of the crankshaft, and the idling time advance angle controlling ignition position $\theta_{igi}$. Then, in Step S514, the ignition position detecting time data $T_{igi}$ is set in the ignition timer, and the $CR_{in}$ processing in FIG. 12 is finished. The idling time advance angle ignition position detecting time data $T_{igi}$ is expressed by the following equation $$T_{igi}=T2\cdot(\theta_{in}-\theta_{igi})/360 \quad (3)$$

where $\theta_{in}$ is an angle between the top dead center position TDC and the generation position $CR_{in}$ of the first negative voltage $V_{n1}$, and the ignition position $\theta_{igi}$ is expressed by an angle measured on the advance side from the top dead center position.

In Step S512, when it is determined that the count value Idle_cnt of the idling time advance angle control counter exceeds the idling time advance angle control number set value IDLENUM, the process proceeds to Step S515, the idling time advance angle control flag is reset to finish the idling time advance angle control. In Step S515, a processing for finishing the idling time advance angle control (resetting the idling time advance angle control flag) is performed, then the process moves to Step S516, the ignition position detecting time data $T_{ign}$ is arithmetically operated by the equation (2) using the generation cycle $T_2$ (the elapsed time for one turn of the crankshaft) of the first negative voltage $V_{n1}$, the rotational speed $N_e$ arithmetically operated in the last $CR_{in}$ processing, and the ignition position $\theta_{ign}$ in normal operation arithmetically operated in the main routine, and in Step S517, the time data $T_{ign}$ is set in the ignition timer to start the measurement thereof. When the ignition timer completes the measurement of the set time data, an unshown interruption processing is performed, and an ignition signal is provided to the discharge switch (thyristor $T_{hi}$) of the ignition circuit.

As described above, in the embodiment, when it is determined that the number of rotations Pulse_cnt of the crankshaft after the commencement of the start operation exceeds the set number STARTNUM even if the rotational speed of the engine does not reach the start completion determination speed, it is determined that the engine is not at the start, the ignition control at the start is finished, and the idling time advance angle control is started.

Then, in the $CR_{out}$ processing in FIG. 13, first in Step S601, the elapsed time $T_{new}$ between crank signals measured this time is stored as the elapsed time $T_{old}$ between crank signals measured last time. Then, the process proceeds to Step S602, it is determined whether the start time determination flag is set to "start time". When it is determined that the start time determination flag is set to "start time" (when it is determined that the engine is at the start), the process proceeds to Step S603, and it is determined whether the arithmetically operated rotational speed $N_e$ is lower than a set rotational speed IGCHNE. When it is determined that the rotational speed $N_e$ is lower than the set rotational speed IGCHNE, the process proceeds to Step S604, ignition position detecting time data $T_{igs}$ at the start is arithmetically operated using the elapsed time $T_1$ (the elapsed time between crank signals measured when the crank interruption processing in FIG. 12 is started) between the detection of the generation position of the first negative voltage and the detection of the generation position of the second negative voltage, and a first start time ignition position $\theta_{igs1}$ set near the top dead center position of the engine. On the other hand, when it is determined in Step S603 that the rotational speed $N_e$ is equal to or higher than the set rotational speed IGCHNE, the process proceeds to Step S605, the ignition position detecting time data $T_{igs}$ at the start is arithmetically operated using the elapsed time $T_1$ and a second start time ignition position $\theta_{igs2}$ set in a position slightly advanced from the top dead center position of the engine (an ignition position suitable as an ignition position in idling).

After Step S604 or S605, the process proceeds to Step S606, it is determined whether a ratio $T_0/T_1$ between the time $T_0$ between the detection of the generation position of the second negative voltage and the detection of the next generation position of the first negative voltage and the time $T_1$ between the detection of the generation position of the first negative voltage and the detection of the generation position of the second negative voltage is lower than a set value DISIGRT. When it is determined that the ratio $T_0/T_1$ is not lower than the set value DISIGRT, the process proceeds to Step S607, the time data $T_{igs}$ arithmetically operated in Step S604 or S605 is set in the ignition timer, and the $CR_{out}$ processing is finished. When it is determined in Step S606 that the ratio $T_0/T_1$ is lower than the set value DISIGRT, the process proceeds to Step S608, the time data $T_{igs}$ arithmetically operated in Step S604 or S605 is prevented from being set in the ignition timer, the ignition operation is stopped, and then the $CR_{out}$ processing is finished. When it is determined in Step S602 that the start time determination flag is not set to "start time", the $CR_{out}$ processing is finished without performing processing thereafter.

In the embodiment, the elapsed time measurement means 22 in FIG. 3 is comprised by Step S401 of the interruption processing in FIG. 11, and the negative voltage generation position detection means 23 is comprised by Step S402 of the interruption processing in FIG. 11. The start completion determination means 24 is comprised by Step S202 of the initialization processing in FIG. 9, Steps S504, S505, S506, and S507 of the $CR_{in}$ processing in FIG. 12, and Steps S602 and S603 of the $CR_{out}$ processing in FIG. 13, and the rotational speed arithmetical operation means 25 is comprised by Step S503 of the $CR_{in}$ processing in FIG. 12.

The start time ignition position detecting time data arithmetical operation means 30 is comprised by Steps S604 and S605 of the $CR_{out}$ processing in FIG. 13, and the ignition permission and prevention means 31 is comprised by Steps S606 and S608 of the $CR_{out}$ processing in FIG. 13. Further, the ignition timer control means 32 is comprised by Step S607 of the $CR_{out}$ processing in FIG. 13. The normal time ignition position detecting time data arithmetical operation means 36 is comprised by Step S516 of the $CR_{in}$ processing in FIG. 12, and the ignition timer control means 37 is comprised by Step S517 in FIG. 12.

Further, the idling time advance angle control permission condition determination means 27 is comprised by Step S512 of the $CR_{in}$ processing in FIG. 12, and the ignition position detecting time data arithmetical operation means 34 for the idling time advance angle control is comprised by Step S513 of the $CR_{in}$ processing in FIG. 12. The ignition timer control means 35 is comprised by Step 514 of the $CR_{in}$ processing in FIG. 12.

As described above, in the ignition device of the embodiment, when the start operation of the engine is commenced, the generation position $CR_{in}$ of the first negative voltage and the generation position $CR_{out}$ of the second negative voltage are first identified using the difference in length between the elapsed times between crank signals, then it is determined whether the internal combustion engine is at the start or has completed the start. When it is determined that the internal combustion engine is at the start, the time data $T_{igs}$ for detecting the ignition position at the start of the engine is calculated using rotational speed information of the engine obtained from the elapsed time (the elapsed time between the detection of the generation position $CR_{in}$ of the first negative voltage and the detection of the generation position of the second negative voltage $CR_{out}$) $T_1$ measured in the generation position $CR_{out}$ of the second negative voltage $V_{n2}$, and the measurement of the time data $T_{igs}$ is immediately started to detect the ignition position at the start and generate the ignition signal at the start.

Comprised as described above, the ignition position at the start can be determined based on the rotational speed information of the engine calculated immediately before the ignition position at the start of the engine when the rotational speed of the crankshaft of the engine minutely varies. This can precisely determine the ignition position at the start and increase startability of the engine.

Comprised as described above, the ignition position at the start of the engine can be set in a position delayed from the generation position $CR_{out}$ of the second negative voltage (a position beyond a section where the exciter coil generates the AC voltage), and thus a wide advance angle width of the ignition position can be obtained.

In the embodiment, when it is determined that the engine is at the start, the ignition permission and prevention means 31 compares the ratio $T_0/T_1$ between the time $T_0$ between the detection of the generation position $CR_{out}$ of the second negative voltage $V_{n2}$ and the detection of the next generation position $CR_{in}$ of the first negative voltage $V_{n1}$ and the time $T_1$ between the detection of the generation position $CR_{in}$ of the first negative voltage and the detection of the generation position $CR_{out}$ of the second negative voltage with the set value, permits the generation of the ignition signal at the start when the ratio $T_0/T_1$ is equal to or higher than the set value (the cranking speed is sufficient), and prevents the generation of ignition signal at the start when the ratio $T_0/T_1$ is lower than the set value (the cranking speed is insufficient). Thus, after the commencement of the start operation, the ignition operation can be prevented when the cranking speed is reduced by an insufficient operation force, thereby preventing a phenomenon (kickback) in which a piston cannot exceed the top dead center and is pushed back when the engine is manually started, and thus increasing safety. The set value compared with the ratio $T_0/T_1$ of the elapsed times is set to such a value that the relationship of $T_0/T_1$ <set value is met when the cranking speed is insufficient to the level at which the kickback may occur.

The ignition permission and prevention means may be comprised so as to permit the generation of the ignition signal at the start when the time $T_1$ between the detection of the generation position $CR_{in}$ of the first negative voltage and the detection of the generation position $CR_{out}$ of the second negative voltage is shorter than the set value, and prevent the generation of the ignition signal at the start when the time $T_1$ exceeds the set value.

In the embodiment, when it is determined that the internal combustion engine has completed the start, and when it is determined that the number of rotations Pulse_cnt of the engine after the commencement of the start operation exceeds the set number STARTNUM though the start of the engine has not been completed, the idling time advance angle control is started before shifting to the ignition control in normal operation, time required for the engine to rotate from the reference crank angle position to the idling time advance angle ignition position $\theta_{igi}$ is arithmetically operated from the ignition position detecting time data $T_{igi}$ using the present rotational speed detected from the detection cycle $T_2$ of the generation position of the first negative voltage measured in the generation position $CR_{in}$ of the first negative voltage (the reference crank angle position), and the time data is measured by the ignition timer to generate the ignition signal for the idling time advance angle control.

In the embodiment, the ignition position having an advance angle obtained by adding a certain advance angle to an advance angle that provides the ignition position at the idling speed in normal operation arithmetically operated with respect to the idling speed of the internal combustion engine calculated from the cycle $T_2$ of the detection of the generation position of the first negative voltage $V_{n1}$ (the position advanced from the ignition position at the idling speed in normal operation of the internal combustion engine) is the idling time advance angle controlling ignition position $\theta_{igi}$.

In the present invention, the idling time advance angle ignition position arithmetical operation means 33 is not exclusively comprised as described above. For example, the idling time advance angle ignition position arithmetical operation means 33 may be comprised so that an ignition position arithmetical operation map exclusive to the idling time advance angle control is prepared, and the idling time advance angle controlling ignition position $\theta_{igi}$ is arithmetically operated by searching the ignition position arithmetical operation map exclusive to the idling time advance angle control with respect to the idling speed of the internal combustion engine calculated from the cycle $T_2$ of the detection of the generation position of the first negative voltage $V_{n1}$. Also, the idling time advance angle ignition position may be a fixed value without providing the idling time advance angle ignition position arithmetical operation means 33.

The idling time advance angle control is performed until the count value Idle_cnt of the idling time advance angle control ignition number counter reaches the set value IDLE-NUM (until the ignition in the idling time advance angle controlling ignition position $\theta_{igi}$ is performed set number of times). When the count value Idle_cnt of the idling time advance angle control ignition number counter exceeds the set value IDLENUM, in Step S515, the idling time advance angle control flag is cleared to finish the idling time advance angle control, shifting to the ignition control in normal operation.

In the ignition control in normal operation, time required for the engine to rotate from the generation position of the first negative voltage $V_{n1}$ to the ignition position in normal operation having been arithmetically operated (the ignition position arithmetically operated with respect to the control conditions including the rotational speed arithmetically operated one turn before) $\theta_{ign}$ is arithmetically operated as the ignition position detecting time data $T_{ign}$ using the rotational speed calculated from the cycle $T_2$ in this generation position of the first negative voltage $V_{n1}$, and the time data is measured by the ignition timer to generate the ignition signal. Thus, in normal operation of the engine, the engine is ignited in the ignition position arithmetically operated with respect to the rotational speed and corrected with respect to other control conditions as required.

As described above, the idling time advance angle control means is provided for controlling the generation position of the ignition signal so as to advance the ignition position of the internal combustion engine from the ignition position during idling in normal operation when it is determined that the internal combustion engine has completed the start, and the idling time advance angle control permission condition determination means determines that the condition for the idling time advance angle control is met. This can prevent a reduction in rotational speed of the engine during idling immediately after completion of the start and maintain the rotation of the engine, thereby allowing idling immediately after the start of the engine to be stabilized in a short time even in cold climates or the like where the rotation of the engine becomes unstable.

The idling time advance angle control is performed only when the predetermined idling time advance angle control permission condition is met (in the above example, when the condition is met that the number of ignitions in the ignition position for the idling time advance angle control does not exceed the set value), thereby preventing the idling speed immediately after the start to be unnecessarily increased.

In the embodiment, as shown in FIG. 13, the two start time ignition positions: the first start time ignition position $\theta_{igs1}$ near the top dead center position, and the second start time ignition position (the ignition position suitable as the ignition position during idling) $\theta_{igs2}$ advanced from the first start time ignition position are set as the ignition positions suitable at the start, the ignition position switching rotational speed IGCHNE for switching the start time ignition positions, and the start completion determination speed SNCHNE for determining whether the engine is in operation at the start are set, ignition is performed in the first start time ignition position $\theta_{igs1}$ near the top dead center position when IGCHNE>rotational speed, and the ignition operation is performed in the second start time ignition position $\theta_{igs2}$ when IGCHNE≦rotational speed<SNCHNE. Thus, in the case where the engine is started by cranking using a starter motor, kickback caused by pulsing of cranking can be prevented. However, the present invention is not limited to the case where the plurality of start time ignition positions are set, but only one ignition position suitable at the start may be set in a position near the top dead center position.

In the above described embodiment, the idling time advance angle control permission condition (the condition for permitting the idling time advance angle control) is that the number of ignitions in the ignition position for the idling time advance angle control does not exceed the set value, but the idling time advance angle control permission condition may be that time for the idling time advance angle control does not exceed a set time, or the rotational speed of the engine does not exceed a set speed in the idling time advance angle control.

Figure 14:
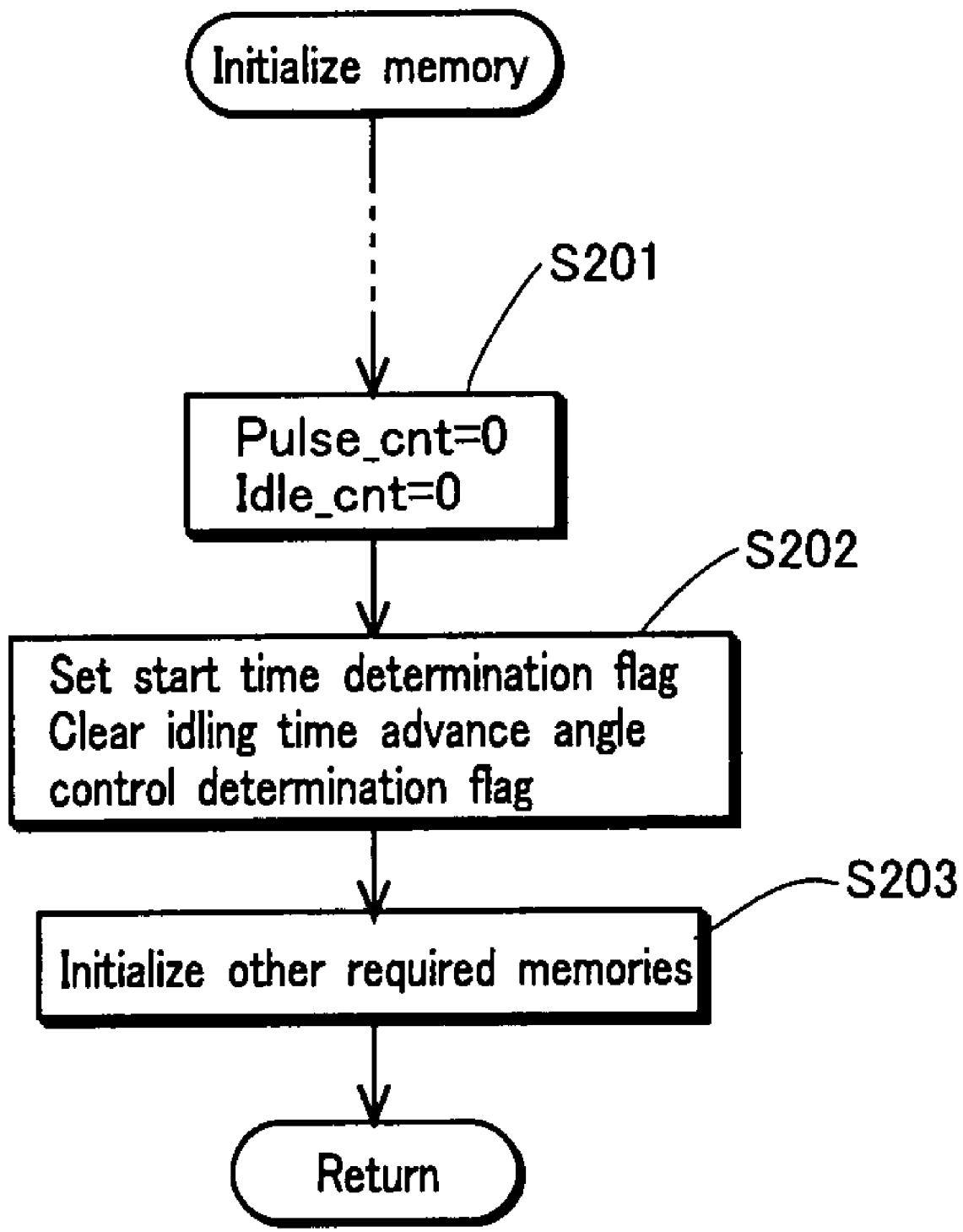
FIG. 14 is a flowchart showing an algorithm of a memory initialization processing executed immediately after activation of a microprocessor in a second embodiment of the present invention.
Figure 15:
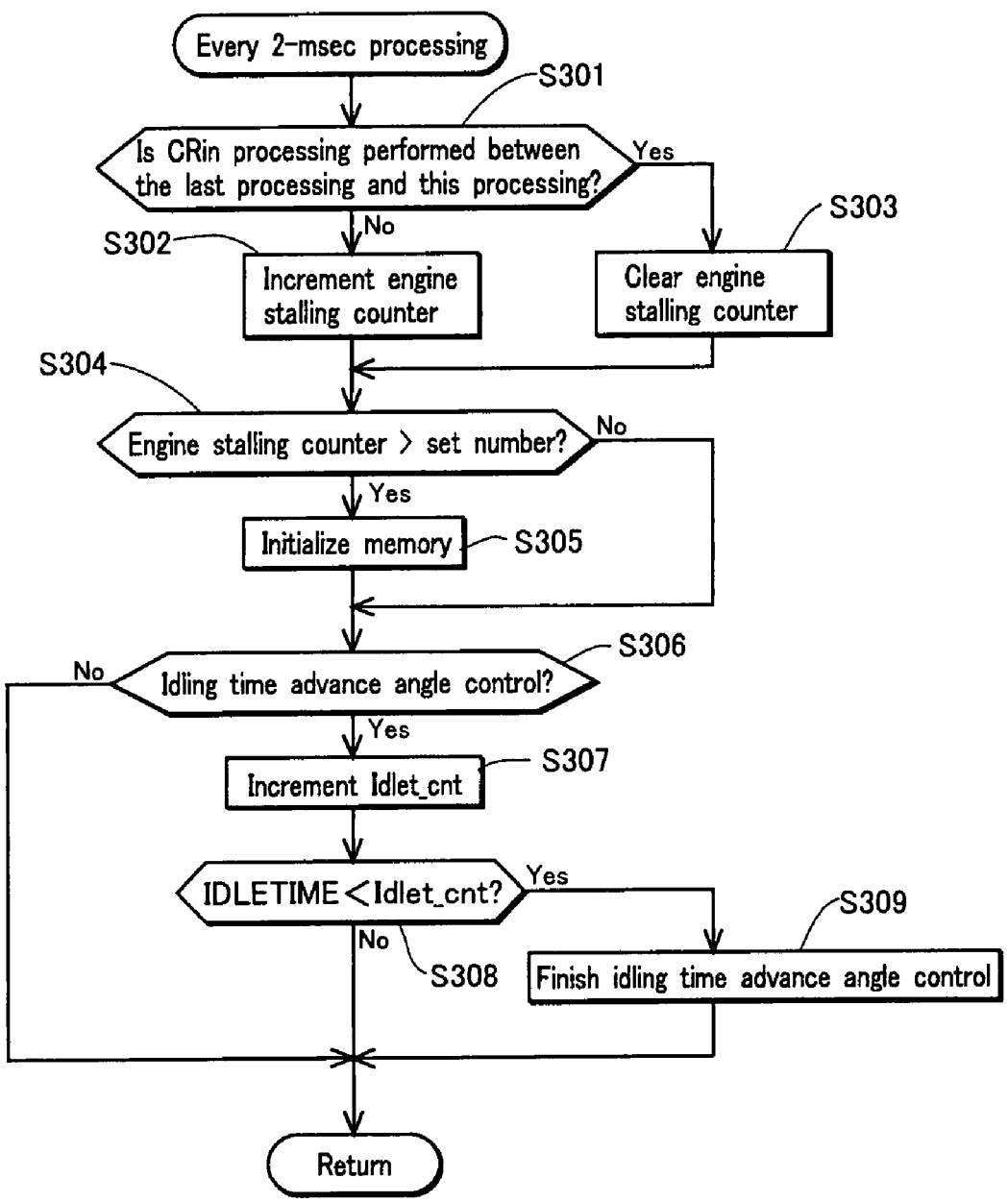
FIG. 15 is a flowchart showing an algorithm of a processing executed by the microprocessor every 2 msec in the second embodiment of the present invention.
Figure 16:
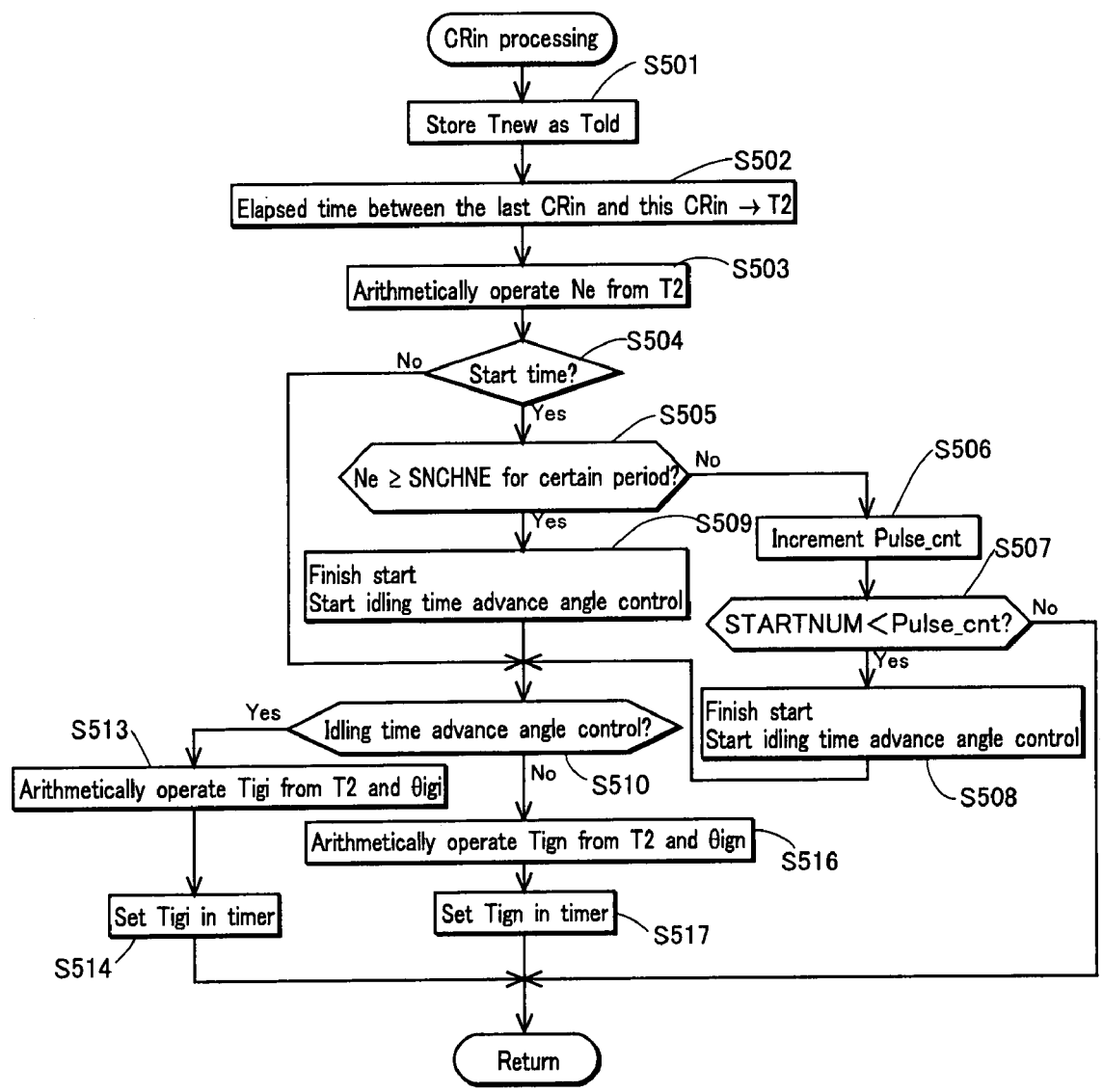
FIG. 16 is a flowchart showing an algorithm of a $CR_{in}$ processing executed by the microprocessor for each detection of a generation position $CR_{in}$ of a first negative voltage output by an exciter coil in the second embodiment of the present invention.

FIGS. 14 to 16 show algorithms of processings executed by a microprocessor in a second embodiment of the present invention in which an idling time advance angle control permission condition is that time for idling time advance angle control does not exceed a set time. FIG. 14 is a flowchart showing an algorithm of a memory initialization processing executed immediately after activation of the microprocessor. FIG. 15 is a flowchart showing an algorithm of an every 2-msec processing executed by the microprocessor every 2 msec in the second embodiment of the present invention, FIG. 16 is a flowchart showing an algorithm of a $CR_{in}$ processing executed by the microprocessor for each detection of a generation position $CR_{in}$ of a first negative voltage output by an exciter coil in the embodiment. In the embodiment, a processing in powering up, a crank interruption processing, and a $CR_{out}$ processing are the same as shown in FIGS. 8, 11 and 13.

In the memory initialization processing in FIG. 14, in Step S201, a count value of an idling time advance angle control time counter Idlet_cnt is cleared. Other points of the processing in FIG. 14 are the same as in the memory initialization processing in FIG. 9, and the crank angle interruption processing and the $CR_{out}$ processing are the same as shown in FIGS. 11 and 13.

In the every 2-msec processing in FIG. 15, processings in Steps S301 to S305 are the same as in the every 2-msec processing in FIG. 10. After the initialization of the memory in Step S305 in FIG. 15, it is determined in Step S306 whether the present control is the idling time advance angle control (whether an idling time advance angle control flag is set). When it is determined that the present control is the idling time advance angle control, in Step S307, the count value Idlet_cnt of the idling time advance angle control time counter is incremented by one, and then in Step S308, it is determined whether Idlet_cnt>IDLETIME. When it is determined that the count value Idlet_cnt of the idling time advance angle control time counter is smaller than the set value IDLETIME, this processing is finished to continue the idling time advance angle control. When it is determined that the count value Idlet_cnt of the idling time advance angle control time counter exceeds the set value IDLETIME, Step S309 is performed to finish the idling time advance angle control.

In the $CR_{in}$ processing in FIG. 16, processings in Steps S501 to S510 are the same as in the $CR_{in}$ processing in FIG. 12. When it is determined in Step S510 in FIG. 16 that the present control is the idling time advance angle control, the process moves to Step S513, ignition position detecting time data $T_{igi}$ is arithmetically operated from a rotational speed of the engine detected from a generation cycle $T_2$ of a first negative voltage $V_{n1}$ and an idling time advance angle ignition position $\theta_{igi}$, and in Step S514, the ignition position detecting time data $T_{igi}$ is set in the ignition timer, and the $CR_{in}$ processing is finished. When it is determined in Step S510 that the present control is not the idling time advance angle control, in Step S516, the ignition position detecting time data $T_{ign}$ is arithmetically operated from the generation cycle $T_2$ of the first negative voltage and an ignition position $\theta_{ign}$ in normal operation having been arithmetically operated. In Step S517, the time data $T_{ign}$ is set in the ignition timer, and the $CR_{in}$ processing is finished.

In this embodiment, idling time advance angle control permission condition determination means 27 is comprised by Step S308 of the every 2-msec processing in FIG. 15. Ignition position detecting time data arithmetical operation means 34 for the idling time advance angle control is comprised by Step S513 of the $CR_{in}$ processing in FIG. 16, and ignition timer control means 35 is comprised by Step S514.

Figure 17:
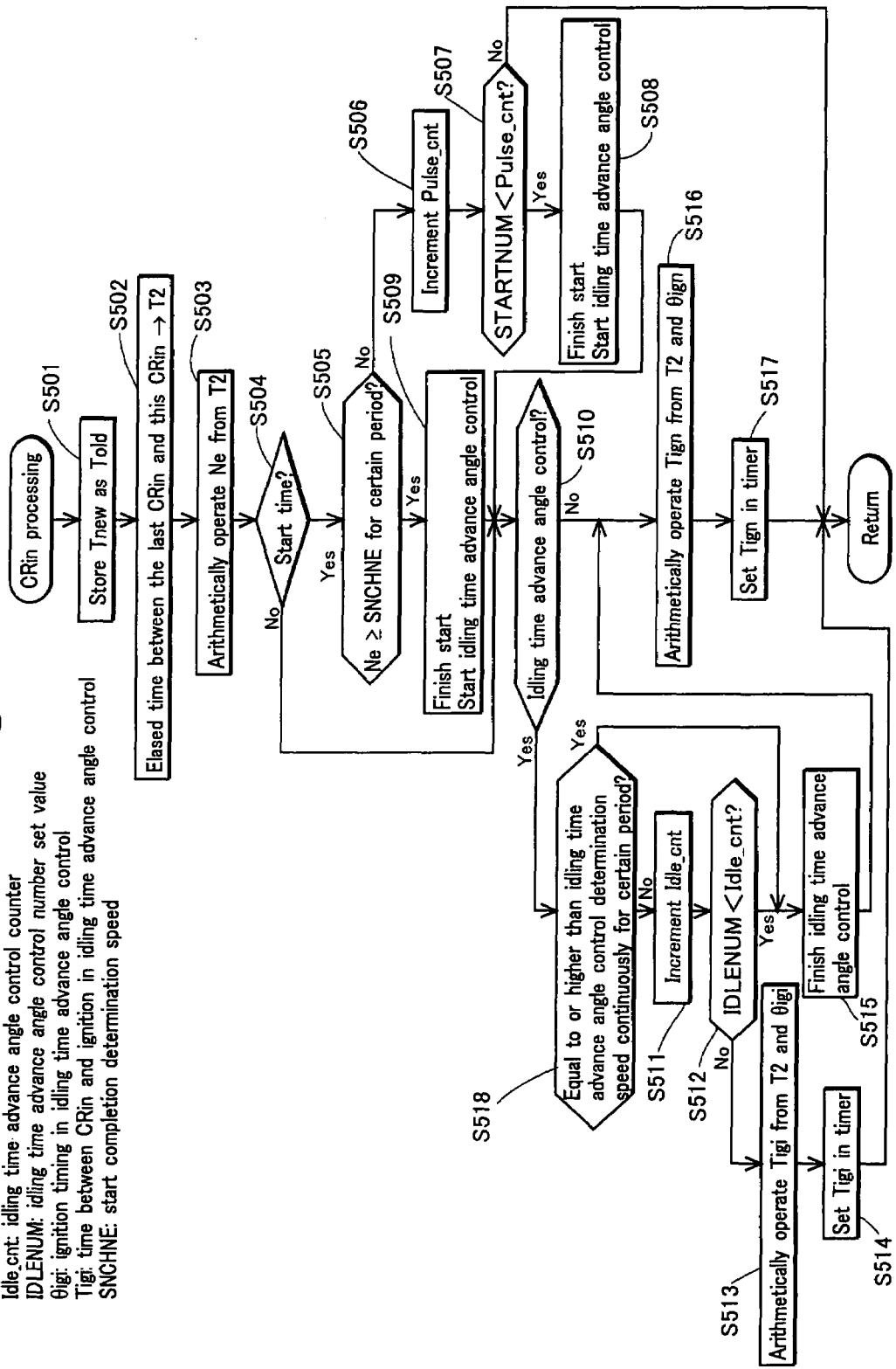
FIG. 17 is a flowchart showing an algorithm of a $CR_{in}$ processing executed by the microprocessor for each detection of a generation position $CR_{in}$ of a first negative voltage output by an exciter coil in a third embodiment of the present invention.

FIG. 17 shows an algorithm of a $CR_{in}$ processing executed by a microprocessor for each generation of a first negative voltage $V_{n1}$ by an exciter coil in a third embodiment of the present invention. Algorithms of a processing in powering up, a memory initialization processing, an every 2-msec processing, a crank interruption processing, and a $CR_{out}$ processing performed for each generation of a second negative voltage $V_{n2}$ are the same as shown in FIGS. 8, 9, 10, 11 and 13.

The $CR_{in}$ processing in FIG. 17 is the $CR_{in}$ processing in FIG. 12 with an addition of Step S518. According to the $CR_{in}$ processing in FIG. 17, when it is determined in Step S510 that the present control is idling time advance angle control, it is determined in Step S518 whether a rotational speed of the engine is equal to or higher than an idling time advance angle control determination speed continuously for a set certain period. When it is determined that the period in which the rotational speed of the engine is continuously equal to or higher than the idling time advance angle control determination speed does not reach the certain period, the process proceeds to Step S511 where a count value Idle_cnt of an idling time advance angle control counter is incremented by one. When it is determined in Step S518 that the period in which the rotational speed of the engine is continuously equal to or higher than the idling time advance angle control determination speed reaches the certain period, the process moves to Step S515, and the idling time advance angle control is finished. Other points are the same as in the $CR_{in}$ processing in FIG. 12.

In this embodiment, idling time advance angle control permission condition determination means 27 is comprised by Steps S518, S511 and S512. The idling time advance angle control permission condition determination means determines that an idling time advance angle control permission condition is met when the period in which the rotational speed of the internal combustion engine is continuously equal to or higher than the idling time advance angle control determination speed does not reach the certain period, and the count value Idle_cnt of the idling time advance angle control counter is equal to or smaller than an idling time advance angle control number set value IDLENUM, and determines that the idling time advance angle control permission condition is no longer met when the period in which the rotational speed of the internal combustion engine is continuously equal to or higher than the idling time advance angle control determination speed reaches the certain period, and when the count value Idle_cnt of the idling time advance angle control counter exceeds the idling time advance angle control number set value IDLENUM though the period in which the rotational speed of the engine is continuously equal to or higher than the idling time advance angle control determination speed does not reach the certain period.

Figure 18:
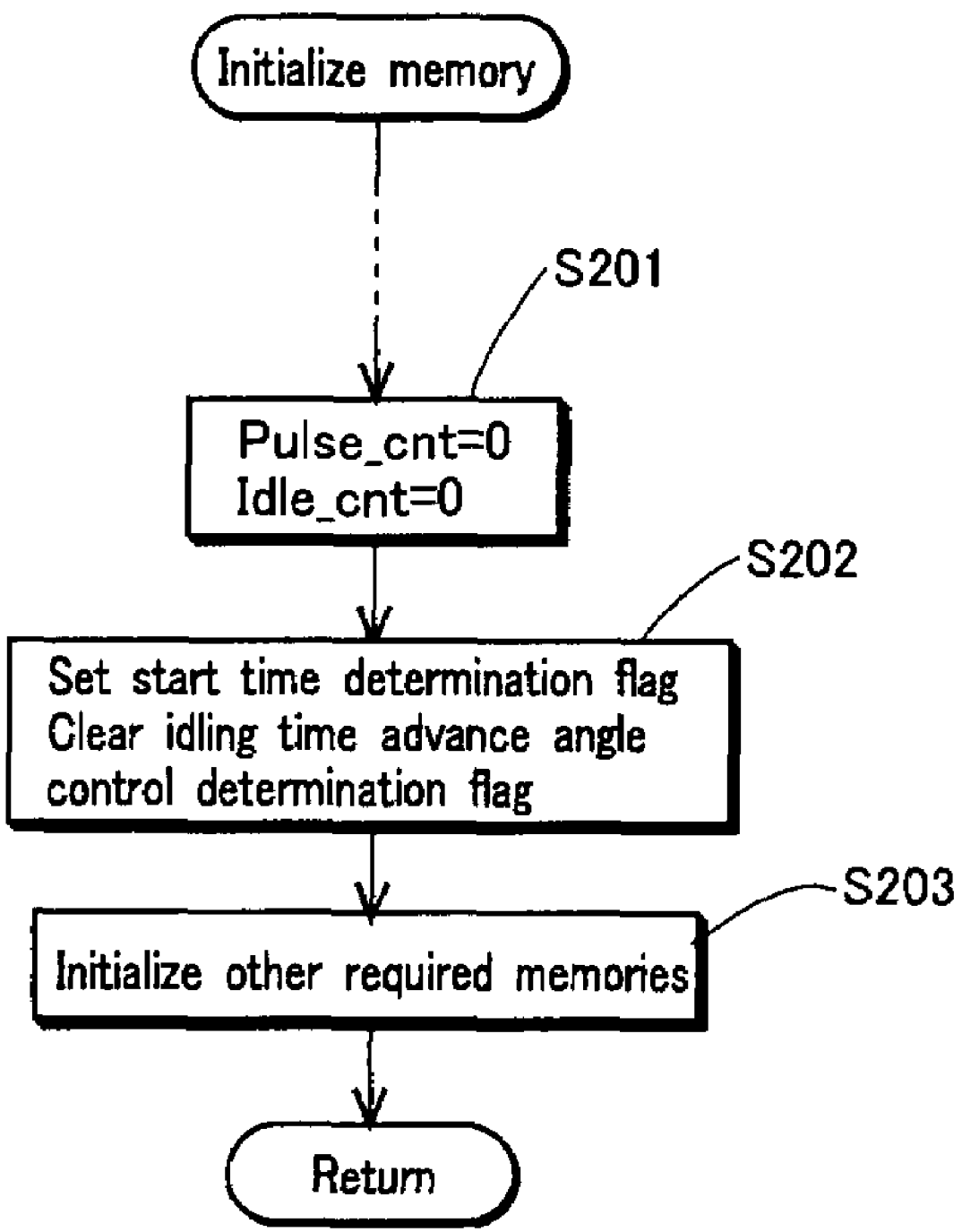
FIG. 18 is a flowchart showing an algorithm of a memory initialization processing executed immediately after activation of a microprocessor in a fourth embodiment of the present invention.
Figure 19:
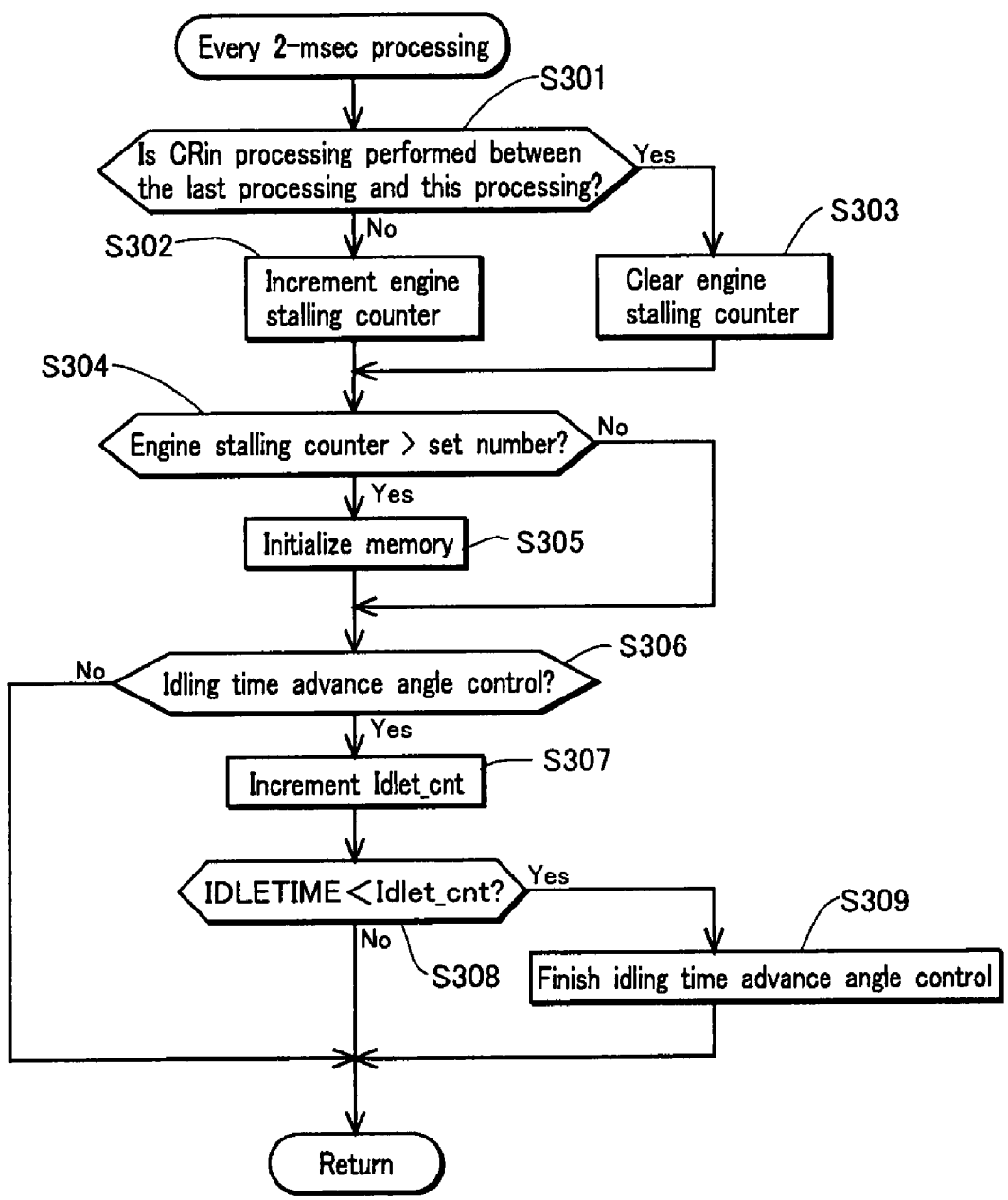
FIG. 19 is a flowchart showing an algorithm of a processing executed by the microprocessor every 2 msec in the fourth embodiment of the present invention.
Figure 20:
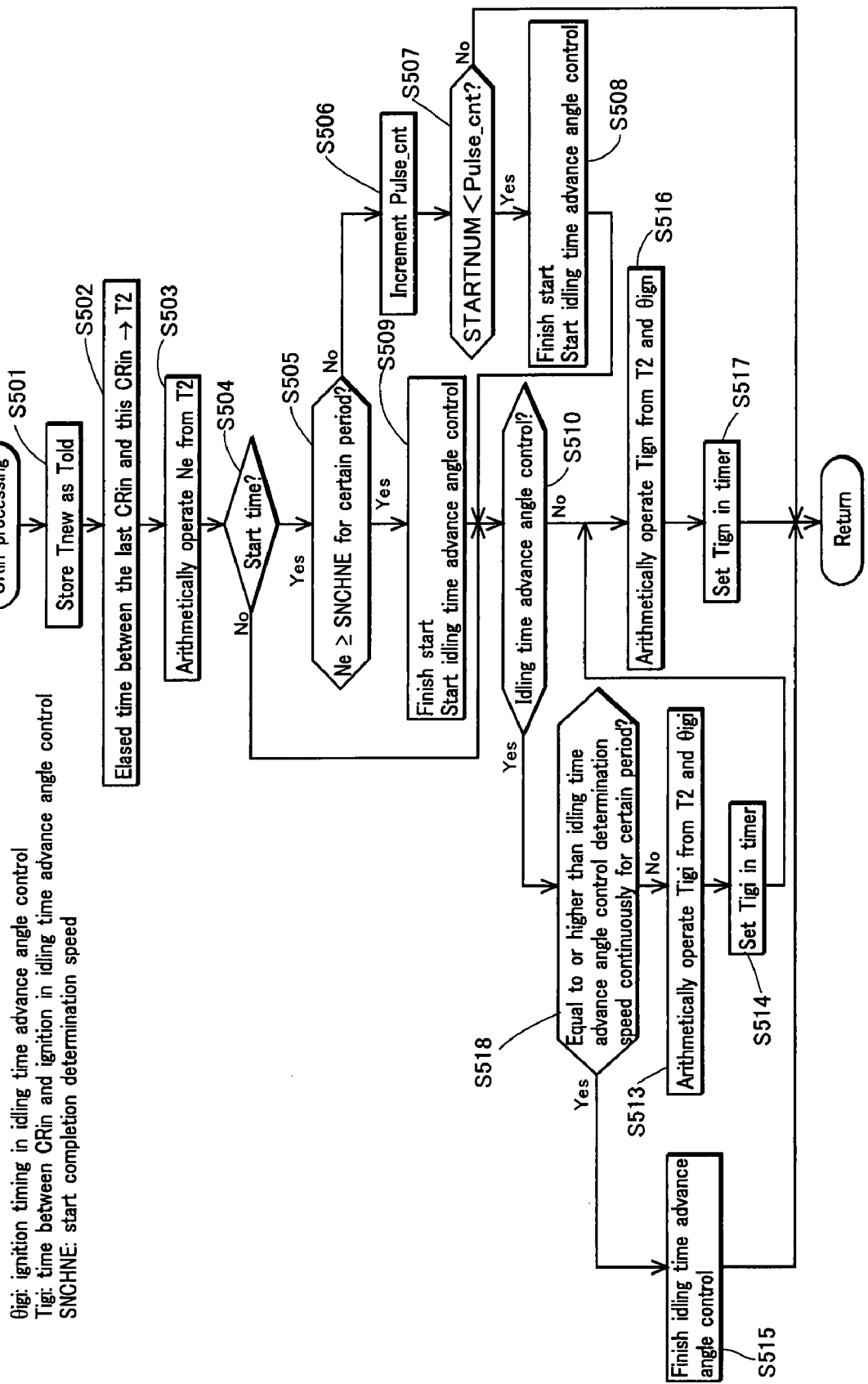
FIG. 20 is a flowchart showing an algorithm of a $CR_{in}$ processing executed by the microprocessor for each detection of a generation position $CR_{in}$ of a first negative voltage output by an exciter coil in the fourth embodiment of the present invention.

FIGS. 18, 19 and 20 show algorithms of a memory initialization processing, a every 2-msec processing, and a $CR_{in}$ processing executed by a microprocessor in a fourth embodiment of the present invention. In the embodiment, algorithms of a processing in powering up, a crank interruption processing, and a $CR_{out}$ processing are the same as in the first embodiment in FIGS. 8, 11 and 13. The memory initialization processing in FIG. 18 is the same as the memory initialization processing in the second embodiment in FIG. 14, and the every 2-msec processing in FIG. 19 is the same as the every 2-msec processing in the second embodiment in FIG. 15.

The $CR_{in}$ processing in FIG. 20 is such that Steps S511 and S512 are omitted from the $CR_{in}$ processing in FIG. 17, and when it is determined in Step S518 that the period in which the rotational speed of the engine is continuously equal to or higher than the idling time advance angle control determination speed does not reach the certain period, the process moves to Step S513 where idling time advance angle ignition position detecting time data $T_{igi}$ is arithmetically operated, and when it is determined in Step S518 that the period in which the rotational speed of the engine is continuously equal to or higher than the idling time advance angle control determination speed reaches the certain period, the process moves to Step S515 where the idling time advance angle control is finished. Other points are the same as in the $CR_{in}$ processing in the first embodiment.

When the $CR_{in}$ processing is comprised as shown in FIG. 20, idling time advance angle control permission condition determination means 27 is comprised so as to determine that an idling time advance angle control permission condition is met when the period in which the rotational speed of the internal combustion engine is continuously equal to or higher than the idling time advance angle control determination speed does not reach the certain period, and determine that the idling time advance angle control permission condition is no longer met when the period in which the rotational speed of the engine is continuously equal to or higher than the idling time advance angle control determination speed reaches the certain period.

As in the third embodiment, the idling time advance angle control is performed only when the period in which the rotational speed of the internal combustion engine is continuously equal to or higher than the idling time advance angle control determination speed does not reach the certain period, and the number of ignitions by the idling time advance angle control means is equal to or smaller than the set value, or as shown in the fourth embodiment, the idling time advance angle control is performed only until the rotational speed of the internal combustion engine is equal to or higher than the idling time advance angle control determination speed continuously for the set determination time. Thus, the idling time advance angle control can reliably prevent a rapid increase in the rotational speed of the engine, thereby allowing the idling immediately after the start of the engine to be stabilized in a short time without providing uncomfortable feeling to a driver.

Figure 21:
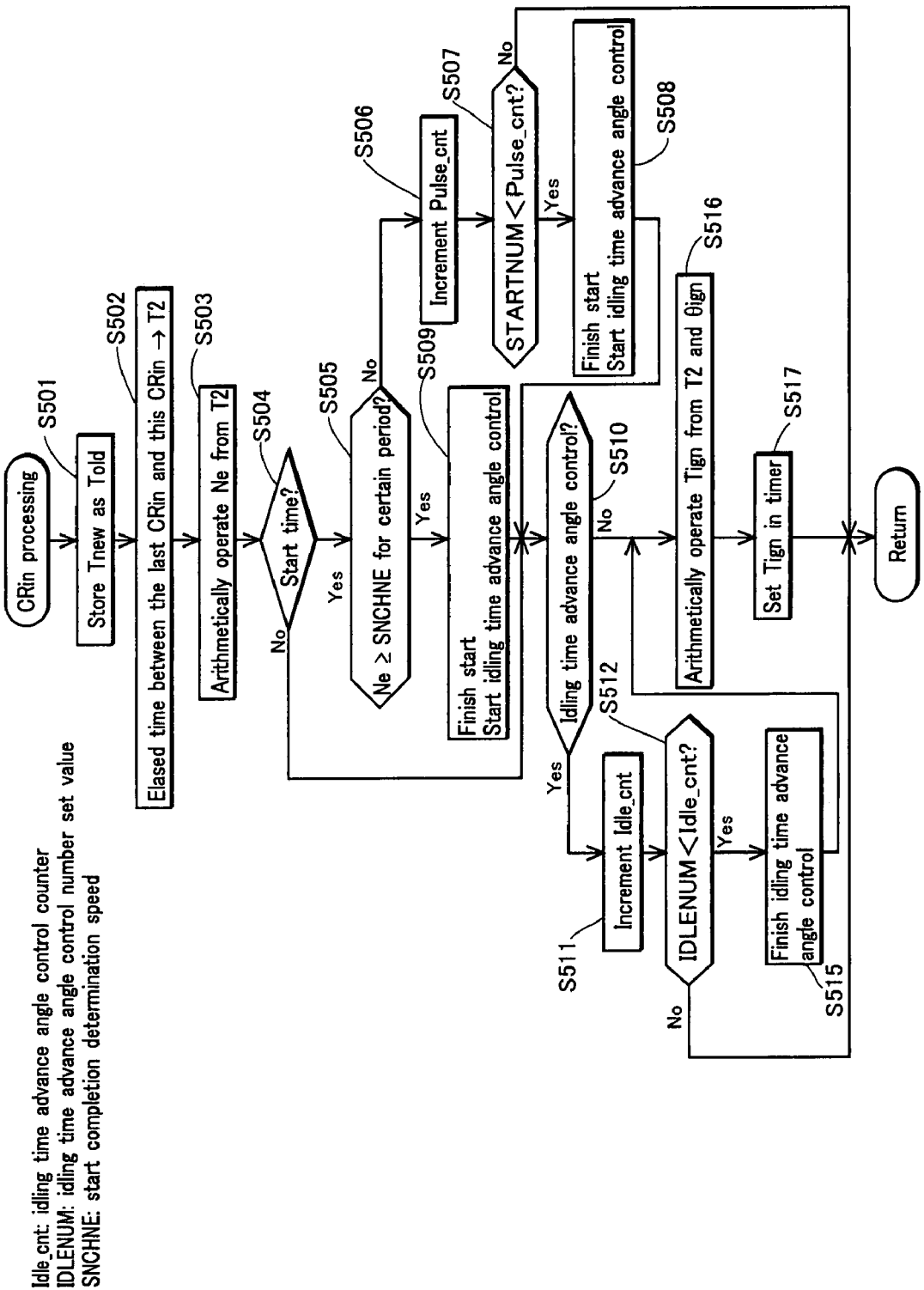
FIG. 21 is a flowchart showing an algorithm of a $CR_{in}$ processing executed by a microprocessor for each detection of a generation position $CR_{in}$ of a first negative voltage output by an exciter coil in a fifth embodiment of the present invention.
Figure 22:
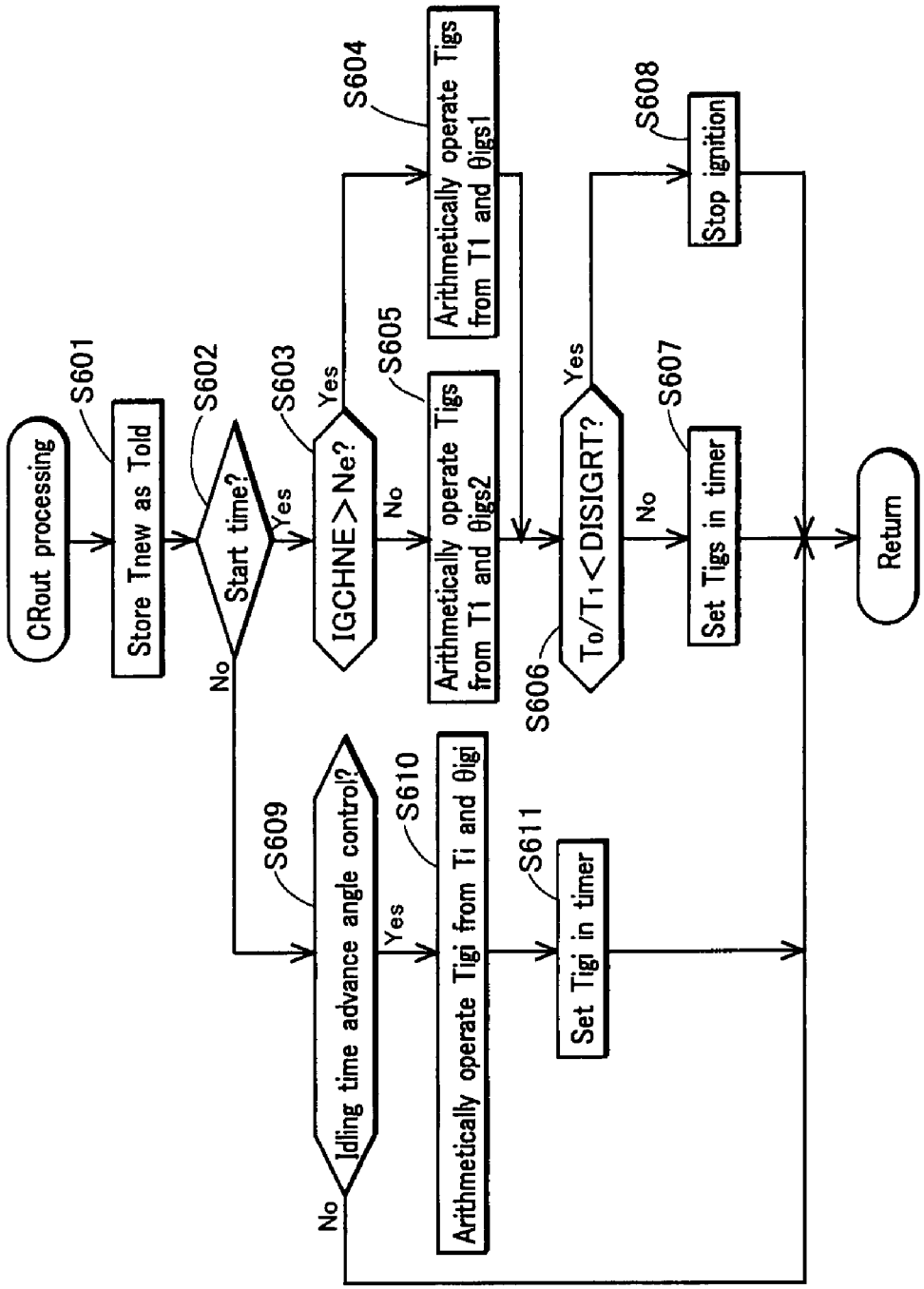
FIG. 22 is a flowchart showing an algorithm of a $CR_{out}$ processing executed by the microprocessor for each detection of a generation position $CR_{out}$ of a second negative voltage output by the exciter coil in the fifth embodiment of the present invention.
Figure 23:
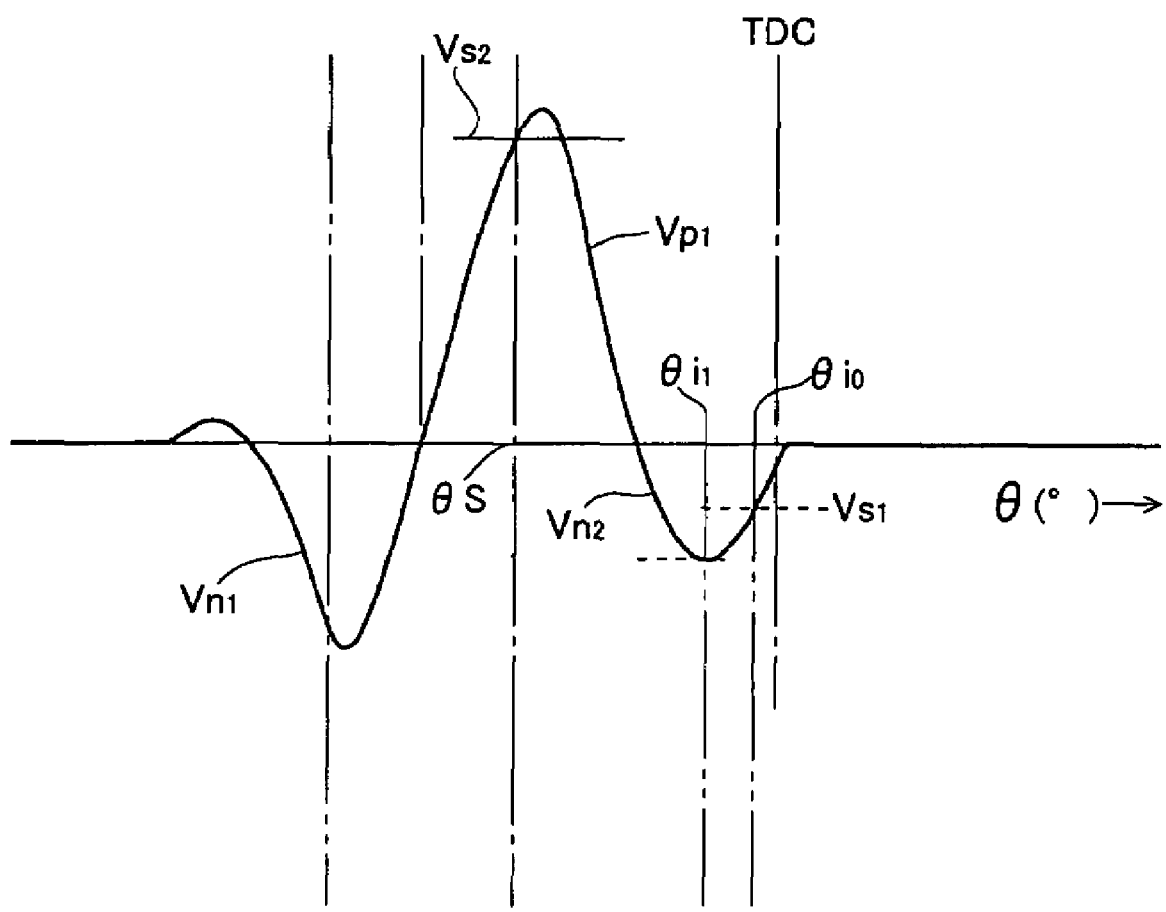
FIG. 23 is a waveform chart showing a waveform of an output voltage of an exciter coil used for illustrating an operation of a conventional ignition device.

FIGS. 21 and 22 show algorithms of a $CR_{in}$ processing and a $CR_{out}$ processing executed by a microprocessor in a fifth embodiment of the present invention. In the embodiment, algorithms of a processing in powering up, a memory initialization processing, an every 2-msec processing, and a crank interruption processing are the same as in FIGS. 8, 9, 10 and 11. In the embodiment, a generation position of a second negative voltage $V_{n2}$ is set in a position advanced from an idling time advance angle ignition position.

The $CR_{in}$ processing in FIG. 21 is such that Steps S513 and S514 are omitted from the $CR_{in}$ processing in FIG. 12. In the $CR_{in}$ processing in FIG. 21, only Step S511 where a count value Idle_cnt of an idling time advance angle control counter is incremented, and a process of performing idling time advance angle control when the count value Idle_cnt of the idling time advance angle control counter is equal to or smaller than an idling time advance angle control number set value IDLENUM, and finishing the idling time advance angle control when the count value Idle_cnt of the idling time advance angle control counter exceeds the idling time advance angle control number set value IDLENUM are performed. Specifically, in the $CR_{in}$ processing in this embodiment, only the determination of the start and the finish of the idling time advance angle control is performed.

In the $CR_{out}$ processing in FIG. 22, when it is determined in Step S602 that the engine is not at the start, Step S609 is performed and it is determined whether the present control is the idling time advance angle control (whether the idling time advance angle control flag is set). When it is determined that the present control is the idling time advance angle control, Step 610 is performed, and idling time advance angle ignition position detecting time data $T_{igi}$ is arithmetically operated from time $T_1$ between generation of a first negative voltage $V_{n1}$ and generation of a second negative voltage $V_{n2}$, and an idling time advance angle ignition position $\theta_{igi}$, and in Step S611, the arithmetically operated ignition position detecting time data $T_{igi}$ is immediately set in an ignition timer. Other points are the same as in the first embodiment.

As shown in FIG. 22, the generation position of the second negative voltage $V_{n2}$ is set in a position advanced from the idling time advance angle ignition position $\theta_{igi}$, and measurement of the idling time advance angle ignition position detecting time data $T_{igi}$ is started in the generation position of the second negative voltage $V_{n2}$, time between setting the ignition position detecting time data $T_{igi}$ in the ignition timer and performing the ignition operation can be reduced, and thus the influence of pulsing of rotation of the engine can be reduced, thereby allowing the idling time advance angle ignition position to be precisely determined, and allowing the idling time advance angle control to be properly performed.

In the embodiment in FIGS. 21 and 22, idling time advance angle control permission condition determination means 27 is comprised by Step S512 in FIG. 21, and idling time advance angle ignition position detecting time data arithmetical operation means 34 and ignition timer control means 35 are comprised by Steps S610 and S611, respectively, in FIG. 22.

In each of the above described embodiments, the two start time ignition positions: the first start time ignition position $\theta_{igs1}$ near the top dead center position, and the second start time ignition position (the ignition position suitable as the ignition position during idling) $\theta_{igs2}$ advanced from the first start time ignition position are set as the ignition positions suitable at the start, the ignition position switching rotational speed IGCHNE for switching the start time ignition positions, and the start completion determination speed SNCHNE for determining whether the engine is in operation at the start are set, ignition is performed in the first start time ignition position $\theta_{igs1}$ near the top dead center position when IGCHNE>rotational speed, and the ignition operation is performed in the second start time ignition position $\theta_{igs2}$ when IGCHNE≦rotational speed<SNCHNE. Thus, in the case where the engine is started by cranking using a starter motor, kickback caused by pulsing of cranking can be prevented. However, the present invention is not limited to the case where the plurality of start time ignition positions are set as described above, but only one ignition position suitable at the start may be set in a position near the top dead center position.

In the example in FIG. 1, the rectangular wave signal Vq having the waveform with the trailing edge from an H-level to an L-level when the exciter coil generates the negative voltage. However, it may be, of course, allowed that a rectangular wave signal Vq having a waveform with a leading edge from an L-level to an H-level when the exciter coil generates the negative voltage, and the leading edge of the rectangular wave signal is used as a crank signal.

Figure 2B:
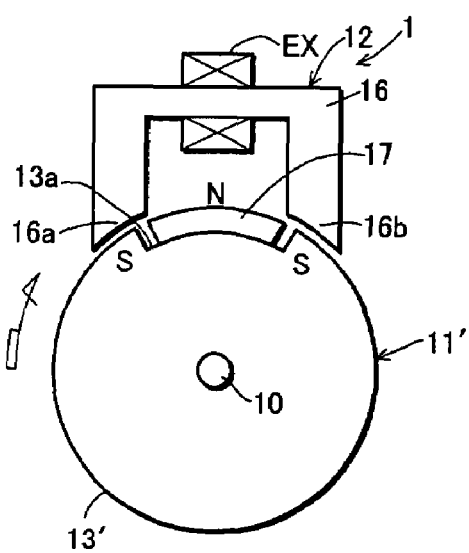

In the above described embodiment, as shown in FIG. 2A, the magnet type AC generator is used including the flywheel magnet rotor 11 in which the permanent magnets and the magnetic path forming member are molded in the flywheel of nonmagnetic material to form the two-pole magnetic field. However, as shown in FIG. 2B, the present invention may be applied to the case where a magnet type AC generator 1 is used including a flywheel magnet rotor 11' in which a permanent magnet 17 is secured in a recess 13a formed in an outer periphery of an iron flywheel 13', and the permanent magnet is magnetized radially of the flywheel to form a three-pole magnetic field, and a stator 12 in which an exciter coil EX is wound around a Π-shaped iron core 16 having, at opposite ends, magnetic pole portions 16a and 16b facing magnetic poles of the magnetic field.

In the embodiment in FIG. 3, the ignition permission and prevention means is provided in the start time ignition control means 26, but may be omitted.

In each of the above described embodiment, in the $CR_{in}$ processing, the number of rotations Pulse_cnt of the crankshaft from the commencement of the start of the engine is compared with the set number STARTNUM, and the control is shifted to control in normal operation when the number of rotations Pulse_cnt exceeds the set number STARTNUM even if the rotational speed of the engine does not reach the start completion determination speed. However, in the $CR_{in}$ processing, it may be allowed that Steps S506 and S507 are omitted, and it is determined whether the operation state of engine is at the start or in normal operation simply by determining whether the rotational speed of the engine reaches the start completion determination speed without comparison between the number of rotations Pulse_cnt and the set number STARTNUM.

In the above described embodiments, the processing by the exciter coil in the generation position $CR_{out}$ of the second negative voltage $V_{n2}$ is performed even after the internal combustion engine becomes in normal operation, but software or hardware may be comprised so that the processing in the generation position $CR_{out}$ of the second negative voltage $V_{n2}$ is not performed after the engine becomes in normal operation.

In the above described embodiments, the number of rotations of the crankshaft from the commencement of the start operation is detected by counting the number of detections of the generation position $CR_{in}$ of the first negative voltage $V_{n1}$, but the number of rotations of the crankshaft from the commencement of the start operation may be detected by counting the number of detections of the generation position $CR_{out}$ of the second negative voltage $V_{n2}$.

Although preferred embodiments of the invention have been described and illustrated with reference to the accompanying drawings, it will be understood by those skilled in the art that these are by way of examples, and that various changes and modifications may be made without departing from the spirit and scope of the invention, which is defined only to the appended claims.

What is claimed is:

1. An ignition device for an internal combustion engine comprising:

an exciter coil that is provided in an AC generator which rotates in synchronism with the engine, and generates an AC voltage once for one turn of a crankshaft of said engine, said AC voltage having a half wave of a positive voltage and a half wave of first negative voltage generated before the half wave of said positive voltage and a half wave of second negative voltage generated after the half wave of said positive voltage;

an ignition capacitor provided on a primary side of an ignition coil and charged to one polarity by said positive voltage;

a discharge switch that conducts when receiving an ignition signal and discharges charges accumulated in said ignition capacitor through a primary coil of said ignition coil; and an ignition control portion that provides the ignition signal to said discharge switch in an ignition position of said internal combustion engine, wherein said ignition control portion comprises:

start completion determination means for determining whether said internal combustion engine is at the start or has completed the start;

start time ignition control means for arithmetically operating an ignition position detecting time data which is a time to be measured for detecting an ignition position of the engine when the rotational position of said engine and a generation position of said second negative voltage are met and controlling a generation position of said ignition signal by immediately starting measurement of the arithmetically operated time data so that the ignition position of said engine is set in a position suitable at the start of the engine, wherein said time data is a time required for said engine to rotate from a generation position of said second negative voltage to the ignition position suitable at the start of the engine at a rotational speed calculated from time between when said first negative voltage is generated and when said second negative voltage is generated;

idling time advance angle control permission condition determination means for determining whether an idling time advance angle control permission condition is met that is a condition for permitting idling time advance angle control to advance an ignition position during idling immediately after completion of the start of said engine from an ignition position during idling in normal operation in order to stabilize idling immediately after completion of the start of said engine;

idling time advance angle control means for controlling the generation position of said ignition signal so that when said idling time advance angle control permission condition determination means determines that the idling time advance angle control permission condition is met, the ignition position during idling immediately after completion of the start of said engine is advanced from the ignition position during idling in normal operation; and normal operation time ignition control means for controlling the generation position of said ignition signal so that when said start completion determination means determines that said internal combustion engine has completed the start, and said idling time advance angle control permission condition determination means determines that the idling time advance angle control permission condition is not met, said ignition position is set in a position suitable in normal operation of said internal combustion engine.

2. An ignition device for an internal combustion engine comprising:

an exciter coil that is provided in an AC generator which rotates in synchronism with the engine, and generates an AC voltage once for one turn of a crankshaft of said engine, said AC voltage having a half wave of a positive voltage and a half wave of first negative voltages generated before the half wave of said positive voltage and a half wave of second negative voltage generated after the half wave of said positive voltage;

an ignition capacitor provided on a primary side of an ignition coil and charged to one polarity by said positive voltage;

a discharge switch that conducts when receiving an ignition signal and discharges charges accumulated in said ignition capacitor through a primary coil of said ignition coil; and an ignition control portion that provides the ignition signal to said discharge switch in an ignition position of said engine, wherein said ignition control portion comprises:

ignition signal generation means including an ignition timer that measures ignition position detecting time data for generating said ignition signal when said ignition timer completes the measurement of the time data;

negative voltage generation position detection means for detecting a generation position of said first negative voltage and a generation position of said second negative voltage;

start completion determination means for determining whether said internal combustion engine is at the start or has completed the start;

start time ignition control means for arithmetically operating said ignition position detecting time data when the rotational position of said engine and a generation position of said second negative voltage are met and controlling a generation position of said ignition signal by causing said ignition timer to immediately start measurement of the arithmetically operated time data so that the ignition position of said engine is set in a position suitable at the start of the engine, wherein said time data is a time required for said engine to rotate from a generation position of said second negative voltage to the ignition position suitable at the start of the engine at a rotational speed calculated from time between when said first negative voltage is detected and when said second negative voltage is detected;

idling time advance angle control permission condition determination means for determining whether an idling time advance angle control permission condition is met that is a condition for permitting idling time advance angle control to advance an ignition position during idling immediately after completion of the start of said engine from an ignition position during idling in normal operation in order to stabilize idling immediately after completion of the start of said internal combustion engine;

idling time advance angle control means for controlling the generation position of said ignition signal so that when said idling time advance angle control permission condition determination means determines that the idling time advance angle control permission condition is met, the ignition position during idling immediately after completion of the start of said internal combustion engine is advanced from the ignition position during idling in normal operation; and normal operation time ignition control means for controlling the generation position of said ignition signal so that when said start completion determination means determines that said internal combustion engine has completed the start, and said idling time advance angle control permission condition determination means determines that the idling time advance angle control permission condition is not met, said ignition position is set in a position suitable in normal operation of said internal combustion engine.

3. The ignition device for an internal combustion engine according to claim 2, wherein said idling time advance angle control means is comprised so as to arithmetically operate said ignition position detecting time data when the rotational position of said engine and a generation position of said second negative voltage are met and control the ignition position of said engine to be advanced from the ignition position during idling in normal operation by causing said ignition timer to start measurement of the arithmetically operated time data at a generation position of said first negative voltage, wherein said ignition position detecting time data is a time required for said engine to rotate from the generation position of said first negative voltage to the idling time advance angle ignition position advanced from the ignition position in normal operation of said engine at an idling speed calculated from a detection cycle of the generation position of said first negative voltage.

4. The ignition device for an internal combustion engine according to claim 2, wherein said idling time advance angle control means is comprised so as to arithmetically operate said ignition position detecting time data when the rotational position of said engine and a generation position of said second negative voltage are met and control the ignition position of said engine to be advanced from the ignition position during idling in normal operation by causing said ignition timer to immediately start measurement of the arithmetically operated time data, wherein said ignition position detecting time data is a time required for said engine to rotate from the generation position of said second negative voltage to the idling time advance angle ignition position advanced from the ignition position in normal operation of said engine at an idling speed calculated from a time between when said generation position of said first negative voltage is detected and when said generation position of said second negative voltage is detected and an angle between the generation position of said first negative voltage and the generation position of said second negative.

5. The ignition device for an internal combustion engine according to claim 2, wherein said idling time advance angle control permission condition determination means is comprised so as to determine that the idling time advance angle control permission condition is met when the number of ignitions by said idling time advance angle control means is equal to or smaller than a set value, and determine that the idling time advance angle control permission condition is not met when the number of ignitions by said idling time advance angle control means exceeds the set value.

6. The ignition device for an internal combustion engine according to claim 2, wherein said idling time advance angle control permission condition determination means is comprised so as to determine that the idling time advance angle control permission condition is met when an elapsed time from the start of control of the ignition position by said idling time advance angle control means is equal to or shorter than a set time, and determine that the idling time advance angle control permission condition is not met when the elapsed time from the start of control of the ignition position by said idling time advance angle control means exceeds the set time.

7. The ignition device for an internal combustion engine according to claim 2, wherein said idling time advance angle control permission condition determination means is comprised so as to determine that the idling time advance angle control permission condition is met when a period in which the rotational speed of said engine is continuously equal to or higher than an idling time advance angle control determination speed does not reach a set certain period, and determine that the idling time advance angle control permission condition is no longer met when the period in which the rotational speed of said engine is continuously equal to or higher than the idling time advance angle control determination speed reaches the set certain period.

8. The ignition device for an internal combustion engine according to claim 2, wherein said idling time advance angle control permission condition determination means is comprised so as to determine that said idling time advance angle control permission condition is met when a period in which the rotational speed of said internal combustion engine is continuously equal to or higher than a set idling time advance angle control determination speed does not reach a set certain period, and when the number of ignitions by said idling time advance angle control means is equal to or smaller than a set value, and determine that the idling time advance angle control permission condition is no longer met when the period in which the rotational speed of said internal combustion engine is continuously equal to or higher than said idling time advance angle control determination speed reaches the certain period, and when the number of ignitions by the idling time advance angle control means reaches the set value though the period in which the rotational speed of the internal combustion engine is continuously equal to or higher than the idling time advance angle control determination speed does not reach the certain period.

9. The ignition device for an internal combustion engine according to claim 2, wherein said normal operation time ignition control means is comprised so as to perform a process of arithmetically operating an ignition position in normal operation of said internal combustion engine arithmetically operated with respect to the rotational speed of said internal combustion engine calculated from a generation cycle of said first negative voltage, and the ignition position detecting time data in normal operation which is a time required for the engine to rotate from the generation position of said first negative voltage to the ignition position in normal operation at the rotational speed of said internal combustion engine calculated from the generation cycle of said first negative voltage, and a process of causing said ignition timer to start the measurement of the ignition position detecting time data in normal operation, when the generation position of said first negative voltage is detected.

10. The ignition device for an internal combustion engine according to claim 2, further comprising:
a waveform shaping circuit that converts an output voltage of said exciter coil as an input to a rectangular wave signal having a trailing edge in the generation position of the negative voltage; and
elapsed time measurement means for recognizing the trailing edge of said rectangular wave signal as a crank signal, reading a measurement value of the timer for each recognition of said crank signal, and measuring an elapsed time between generation of the last crank signal and generation of this crank signal,
wherein said negative voltage generation position detection means is comprised so as to compare an elapsed time $T_{old}$ detected last time by said elapsed time measurement means with an elapsed time $T_{new}$ detected this time, detect that this generation position of the crank signal is the generation position of the first negative voltage when the relationship of $T_{new} < T_{old}/k$ (k is a constant equal to or larger than one) is not met, and detect that this generation position of the crank signal is the generation position of the second negative voltage when the relationship of $T_{new} < T_{old}/k$ is met.

11. The ignition device for an internal combustion engine according to claim 2, wherein said start completion determination means is comprised so as to determine that said internal combustion engine is at the start when the rotational speed of said internal combustion engine is lower than a start completion determination speed, and determine that said internal combustion engine has completed the start when the rotational speed of said internal combustion engine is equal to or higher than said start completion determination speed continuously for a certain period.

12. The ignition device for an internal combustion engine according to claim 2, wherein said start completion determination means is comprised so as to determine that said internal combustion engine is at the start when the rotational speed of said internal combustion engine is lower than the start completion determination speed, and the number of rotations of the crankshaft of said engine after the commencement of the start operation of the internal combustion engine is equal to or smaller than a set number, and determine that said internal combustion engine has completed the start when the rotational speed of said internal combustion engine is equal to or higher than the start completion determination speed continuously for a certain period, and when the number of rotations of the crankshaft of said engine after the commencement of the start operation of said internal combustion engine exceeds said set number though the rotational speed of said internal combustion engine is lower than the start completion determination speed, and
 said set number is set to a value corresponding to the maximum number of rotations of the crankshaft when cranking is manually performed in a state where said internal combustion engine cannot be started.

13. The ignition device for an internal combustion engine according to claim 2, wherein a plurality of ignition positions suitable at said start are previously set, and an optimum ignition position is selected from the ignition positions set as the ignition positions suitable at the start according to said rotational speed arithmetically operated from a detection cycle of the generation position of said first negative voltage.

14. The ignition device for an internal combustion engine according to claim 2, wherein said start time ignition control means includes ignition permission and prevention means for permitting generation of the ignition signal at said start when a ratio $T_0/T_1$ between time $T_0$ between the detection of the generation position of said second negative voltage and detection of the next generation position of the first negative voltage and time $T_1$ between the detection of the generation position of said first negative voltage and the detection of the generation position of the second negative voltage is equal to or larger than a set value, and preventing the generation of the ignition signal at said start when said ratio $T_0/T_1$ is smaller than the set value.

15. The ignition device for an internal combustion engine according to claim 2, wherein said start time ignition control means includes ignition permission and prevention means for permitting generation of the ignition signal at said start when the time $T_1$ between the detection of the generation position of said first negative voltage and the detection of the generation position of the second negative voltage is equal to or shorter than a set value, and preventing the generation of the ignition signal at said start when said time $T_1$ exceeds the set value.

\* \* \* \* \*